United States Patent
Nonaka et al.

(10) Patent No.: US 9,619,591 B2
(45) Date of Patent: Apr. 11, 2017

(54) ANALYSIS SUPPORTING METHOD AND ANALYSIS SUPPORTING APPARATUS

(75) Inventors: Norihiko Nonaka, Tokyo (JP); Koma Sato, Tokyo (JP)

(73) Assignee: Hitachi, Ltd., Tokyo (JP)

(*) Notice: Subject to any disclaimer, the term of this patent is extended or adjusted under 35 U.S.C. 154(b) by 875 days.

(21) Appl. No.: 13/984,599

(22) PCT Filed: Feb. 23, 2011

(86) PCT No.: PCT/JP2011/053962
§ 371 (c)(1),
(2), (4) Date: Aug. 9, 2013

(87) PCT Pub. No.: WO2012/114471
PCT Pub. Date: Aug. 30, 2012

(65) Prior Publication Data
US 2013/0325422 A1 Dec. 5, 2013

(51) Int. Cl.
*G06F 7/60* (2006.01)
*G06F 17/10* (2006.01)
*G06F 17/50* (2006.01)

(52) U.S. Cl.
CPC ...... *G06F 17/5009* (2013.01); *G06F 17/5086* (2013.01); *G06F 2217/16* (2013.01)

(58) Field of Classification Search
CPC ............. G06F 17/5009; G06F 17/5086; G06F 2217/16
See application file for complete search history.

(56) References Cited

U.S. PATENT DOCUMENTS

| | | | | |
|---|---|---|---|---|
| 2007/0088530 | A1* | 4/2007 | Erignac | G06F 17/5009 703/1 |
| 2010/0004769 | A1* | 1/2010 | Holden | G06F 17/5086 700/97 |

FOREIGN PATENT DOCUMENTS

| | | | |
|---|---|---|---|
| JP | 2002-183707 A | | 6/2002 |
| JP | 2002183707 A | * | 6/2002 |
| JP | 2004-110470 A | | 4/2004 |
| JP | 2005-50027 A | | 2/2005 |
| JP | 2005050027 A | * | 2/2005 |

OTHER PUBLICATIONS

Nonaka, Norihiko et al., "An Automatic Technique for CAE Analyis with a 3D-CAD Model", Sep. 29-Oct. 2, 2002, Proceedings of DETC'02 ASME 2002 Design Engineering Technical Conferencs and Computers and Information in Engineering Conference.*
Corresponding International Search Report with English Translation dated May 24, 2011 (three (3) pages).

* cited by examiner

*Primary Examiner* — Cedric D Johnson
(74) *Attorney, Agent, or Firm* — Crowell & Moring LLP

(57) ABSTRACT

A response surface can be built with reduced analysis time and shortened time for objective value calculation using the response surface. To achieve this, a connection information generating unit divides data of a machine structure constituting an analysis target into a plurality of parts via an input unit, and parameterizes a distribution of a physical quantity at a connection boundary thereof so as to be given and received as a parameter of a physical quantity of adjacent divided shape data. A response surface generating unit parameterizes a response surface based on the parameterized distribution of the attribute value.

7 Claims, 18 Drawing Sheets

FIG. 15

ANALYSIS MODEL: PART C

ANALYSIS CONDITION

INLET BOUNDARY IN1   U: 50 m/s   V: 0 m/s   W: 0 m/s
DEM: 1.4 kg/m³   TEMP: 350 K

OUTLET BOUNDARY OUT1   Pre: 0.12M Pa

RESPONSE SURFACE GENERATION CONDITION

| DESIGN VARIABLE | LOWER LIMIT VALUE | INITIAL VALUE | UPPER LIMIT VALUE |
|---|---|---|---|
| A1 | 800 ≦ | 900 | ≦ 1000 |
| A2 | 400 ≦ | 500 | ≦ 600 |

OBJECTIVE FUNCTION   DP1: PRESSURE DIFFERENCE   IP: INLET DYNAMIC PRESSURE
Z1: MATERIAL COST

NUMBER OF SAMPLINGS: 20   NUMBER OF CPUS: 5

DETERMINE   CANCEL

ANALYSIS SUPPORTING METHOD AND ANALYSIS SUPPORTING APPARATUS

TECHNICAL FIELD

The present invention relates to a technique of an analysis supporting method and an analysis supporting apparatus performing analysis using a response surface.

BACKGROUND ART

In the related art, in shape optimization using numerical simulation targeting a machine structure, there is an optimization technique which uses a response surface in order to reduce optimization calculation time. This is to calculate a relational expression between design variables such as sizes of the machine structure and an objective function such as a pressure loss coefficient obtained through numerical simulation by performing the numerical simulation using a plurality of parameter surveys, and to calculate a value of the objective function (objective value) so as to perform optimization calculation by using the relational expression instead of the numerical simulation.

For example, PTL 1 discloses an optimal design calculating device which can appropriately calculate a response surface and can appropriately perform optimization calculation by using a combination of uniformly distributed explanatory variables.

In addition, there is a combination of analysis results of an overall analysis region and a local analysis region as an analysis technique using a plurality of analysis regions.

For example, PTL 2 discloses a flow analysis system and a flow analysis method in which scales and regions where a phenomenon or a parameter of interest becomes apparent are focused, and each scale and region can be evaluated with allowable accuracy.

CITATION LIST

Patent Literature

PTL 1: JP-A-2004-110470
PTL 2: JP-A-2005-50027

SUMMARY OF INVENTION

Technical Problem

In the optimization technique using a response surface in the related art, a plurality of numerical simulations are executed, and a response surface is created from a result thereof. For this reason, in this technique, if an analysis region becomes large, analysis time required for numerical simulation itself for obtaining a response surface increases, and, as a result, an enormous amount of time is also required for optimization calculation using the response surface.

In the technique disclosed in PTL 1, reduction in time for obtaining a response Surface is not sufficiently taken into consideration.

On the other hand, in the analysis technique using a plurality of analysis regions in the related art, detailed behaviors of an analysis region for local analysis are grasped using an overall analysis result as a boundary condition or a model parameter of a local analysis model. In other words, the technique is a technique for grasping behaviors of any portion of the analysis region and is not a technique for gasping behaviors of an overall analysis region. In addition, if an analysis region becomes large, analysis time required for a numerical simulation itself increases.

In the technique disclosed in PTL 2 as well, reduction in analysis time is not sufficiently taken into consideration.

In light of this background, an object of the present invention is to enable a response surface to be built with reduced analysis time and to thereby shorten time for objective value calculation using the response surface.

Solution to Problem

In light of the above-described problems, in the present invention, shape data of an object which is an analysis target is divided in plurality, a distribution of an attribute value at a connection portion thereof is parameterized so as to be given and received as an attribute value of adjacent divided shape data, and a response surface is parameterized based on the parameterized distribution of the attribute value.

Other solutions to the problems are appropriately described in embodiments.

Advantageous Effects of Invention

According to the present invention, it is possible to build a response surface with reduced analysis time and to thereby shorten time for objective value calculation using the response surface.

BRIEF DESCRIPTION OF DRAWINGS

FIG. 15 is a diagram illustrating an example of the analysis information input screen regarding a part C.

DESCRIPTION OF EMBODIMENTS

Next, embodiments of the present invention will be described in detail with appropriate reference to the drawings.

<Apparatus Configuration>

Figure 1:
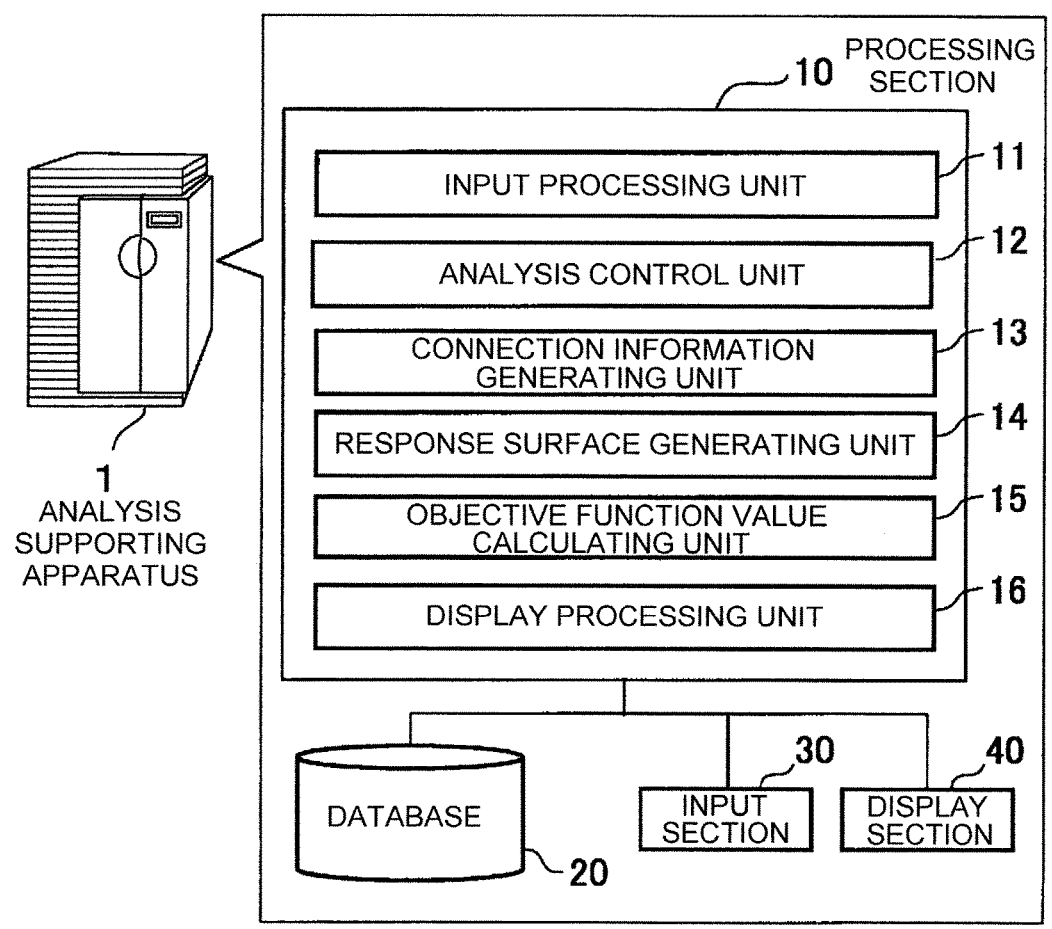
FIG. 1 is a functional block diagram illustrating a configuration example of the analysis supporting apparatus according to the present embodiment.

FIG. 1 is a functional block diagram illustrating a configuration example of an analysis supporting apparatus according to the present embodiment.

The analysis supporting apparatus 1 includes processing section 10, a database 20 which is a storage section storing a variety of information, an input section 30 such as a keyboard, and a display section 40 such as a display.

The processing section 10 includes an input processing unit 11, an analysis control unit 12, a connection information generating unit (parameterization processing unit) 13, a response surface generating unit (parameterization processing unit) 14, an objective function value calculating unit (objective value calculating unit) 15, and a display processing unit 16.

The input processing unit 11 stores a variety of information which is input via the input section 30 in the database 20.

The analysis control unit 12 generates a test plan using an LHS (Latin Hypercube Sampling) method, and performs a fluid analysis for each part.

The connection information generating unit 13 parameterizes a result of the fluid analysis performed by the analysis control unit 12, using a Kriging model.

The response surface generating unit 14 parameterizes a response surface of each part which has a design variable as a master variable of the part and an objective function as a dependent variable, using the Kriging model.

The objective function value calculating unit 15 connects an input and an output of the parameterized response surface of each part which is generated by the response surface generating unit 14, thereby calculating an objective function value (objective value) of all the parts.

The display processing unit 16 displays information on the display section 40.

In addition, the analysis supporting apparatus 1 is an apparatus realized by a PC (Personal Computer) or the like, and a program stored in a ROM (Read Only Memory) or an HDD (Hard Disk Drive) (not shown) is developed on a RAM (Random Access Memory) and is executed by a CPU (Central Processing Unit), thereby implementing the analysis supporting apparatus.

In addition, in the present embodiment, the analysis supporting apparatus 1 is formed by a single apparatus; however, the database 20 may be a separate device, or any function of the functions of the respective units 11 to 16 may be implemented by other devices.

<Flowchart (in Case of Two Parts)>

Next, an analysis supporting process (in a case of two parts) according to the present embodiment will be described with reference to FIGS. 2 to 12 while referring to FIG. 1.

Figure 2:
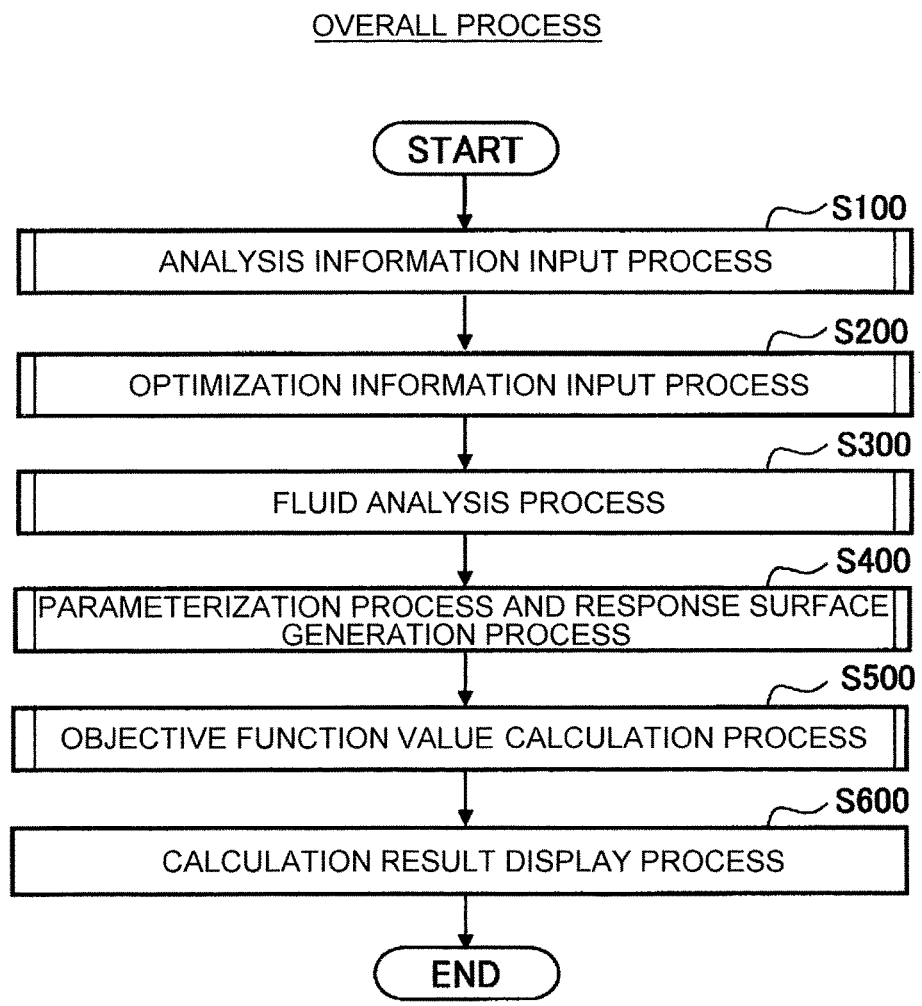
FIG. 2 is a flowchart illustrating procedures of an overall process of an analysis supporting process according to the present embodiment.

FIG. 2 is a flowchart illustrating procedures of an overall process of the analysis supporting process according to the present embodiment.

First, an analysis information input process is performed (S100) in which information regarding an analysis model which is a model as an analysis target or analysis information which is information of a condition for generating a response surface is input via the input section 30, and the input processing unit 11 stores the input analysis information in the database 20.

Successively, an objective function value calculation information input process is performed (S200) in which information regarding a connection portion of the analysis model, objective function value calculation information which is information regarding calculation of an objective function value, or the like is input via the input section 30, and the input processing unit 11 stores input optimization information in the database 20. Details of the process in step S100 will be described later with reference to FIGS. 3 to 6, and details of the process in step S200 will be described later with reference to FIGS. 7 and 8.

Next, a fluid analysis process is performed (S300) in which the analysis control unit 12 performs a test plan for the analysis model so as to perform fluid analysis. Details of the process in step S300 will be described later with reference to FIG. 9.

In addition, a response surface generation process is performed (S400) in which the connection information generating unit 13 performs a parameterization process of parameterizing a physical quantity distribution at a boundary of a connection portion of divided parts according to the information input through the analysis information input process in step S100 or the objective function value calculation information input process in step S200, and, further, the response surface generating unit 14 generates a parameterized response surface by using the parameterized physical quantity distribution at the boundary of the connection portion of the parts. Details of the process in step S400 will be described later with reference to FIGS. 10 and 11.

Successively, an objective function value calculation process is performed (S500) in which the objective function value calculating unit 15 connects an input and an output of each response surface for each part generated in step S400, so as to calculate an objective function value according to the information input through the analysis information input process in step S100 or the objective function value calculation information input process in step S200, and a calculation result display process is performed (S600) in which the display processing unit 16 displays the calculation result of the objective function value calculation process in step S500 on the display section 40. Details of the process in step S500 will be described later with reference to FIG. 12, and the calculation result of the objective function value calculation process will be described with reference to FIG. 13.

[Analysis Information Input Process]

Figure 3:
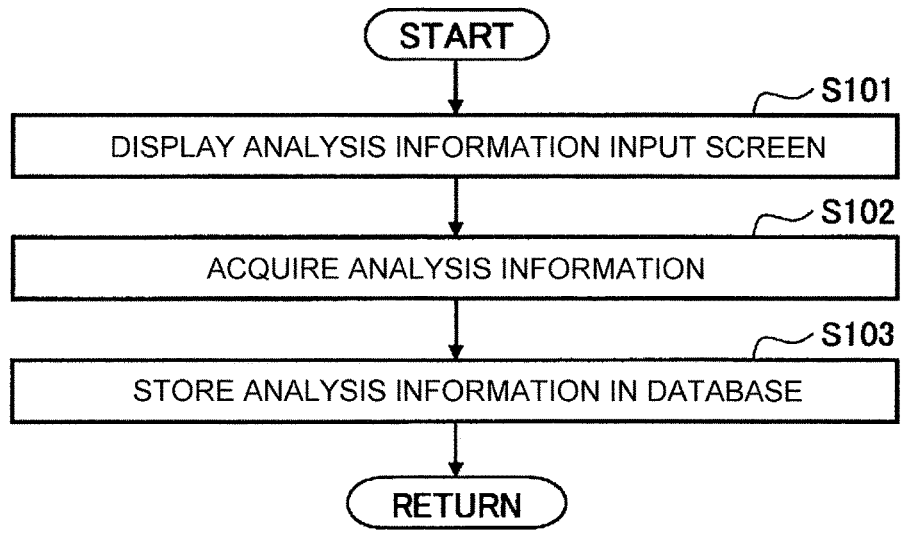
FIG. 3 is a flowchart illustrating detailed procedures of an analysis information input process according to the present embodiment.

FIG. 3 is a flowchart illustrating detailed procedures of the analysis information input process (S100) according to the present embodiment.

First, the display processing unit 16 displays an analysis information input screen 500 described later with reference to FIGS. 5 and 6 on the display section 40 (S101).

In addition, the input processing unit 11 acquires analysis information which is input to the analysis information input screen 500 via the input section 30 (S102) and stores the acquired analysis information in the database 20 (S103).

Figure 4:
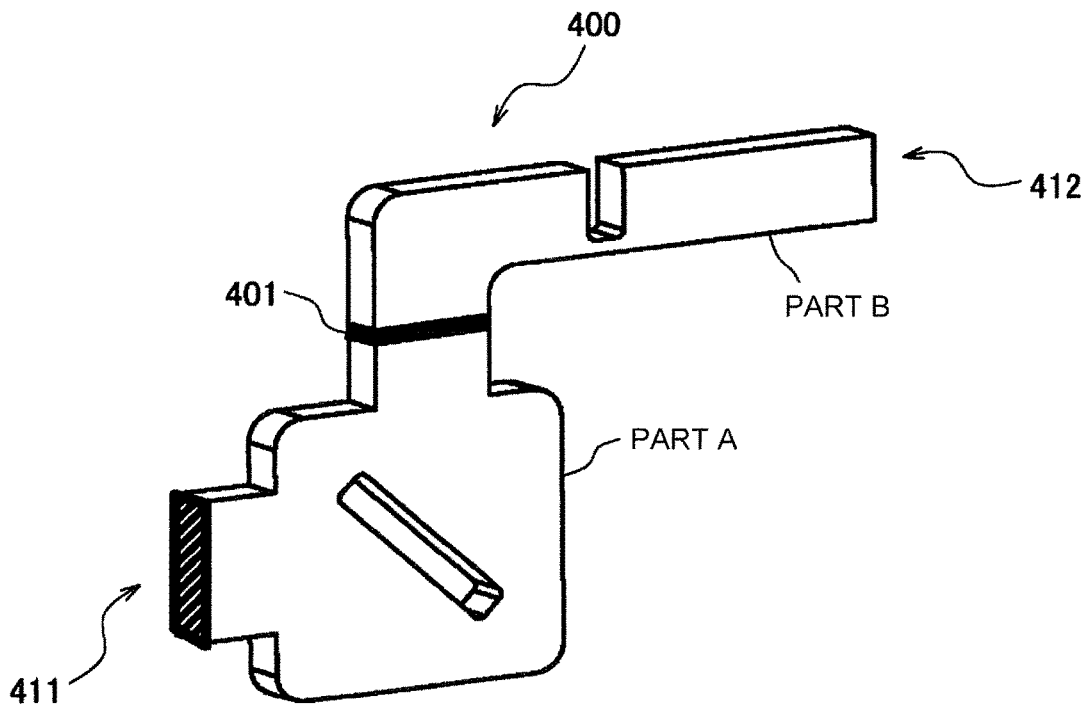
FIG. 4 is a diagram illustrating an example of the machine structure which is an analysis target in the present embodiment (two divisions).

FIG. 4 is a diagram illustrating an example of the machine structure which is an analysis target in the present embodiment.

As shown in FIG. 4, the machine structure (shape data) 400 is constituted by a part A and a part B which are divided shape data items and is an assembly through which a fluid can flow.

The part A and the part B are connected in a connection portion 401. In the machine structure 400, a fluid flows thereinto from an inlet boundary 411, flows from the part A to the part B via the connection portion 401, and flows out of an outlet boundary 412.

In addition, although, in the present embodiment, the machine structure 400 is a structure constituted by the part A and the part B, in the machine structure 400 which is an integrated part, the connection portion 401 may be forced to be formed on CAD (Computer Aided Design) so as to form the part A and the part B.

Here, an example of two divisions is shown; however, three divisions or four or more divisions may be employed as described later.

(Analysis Information Input Screen)

Figure 5:
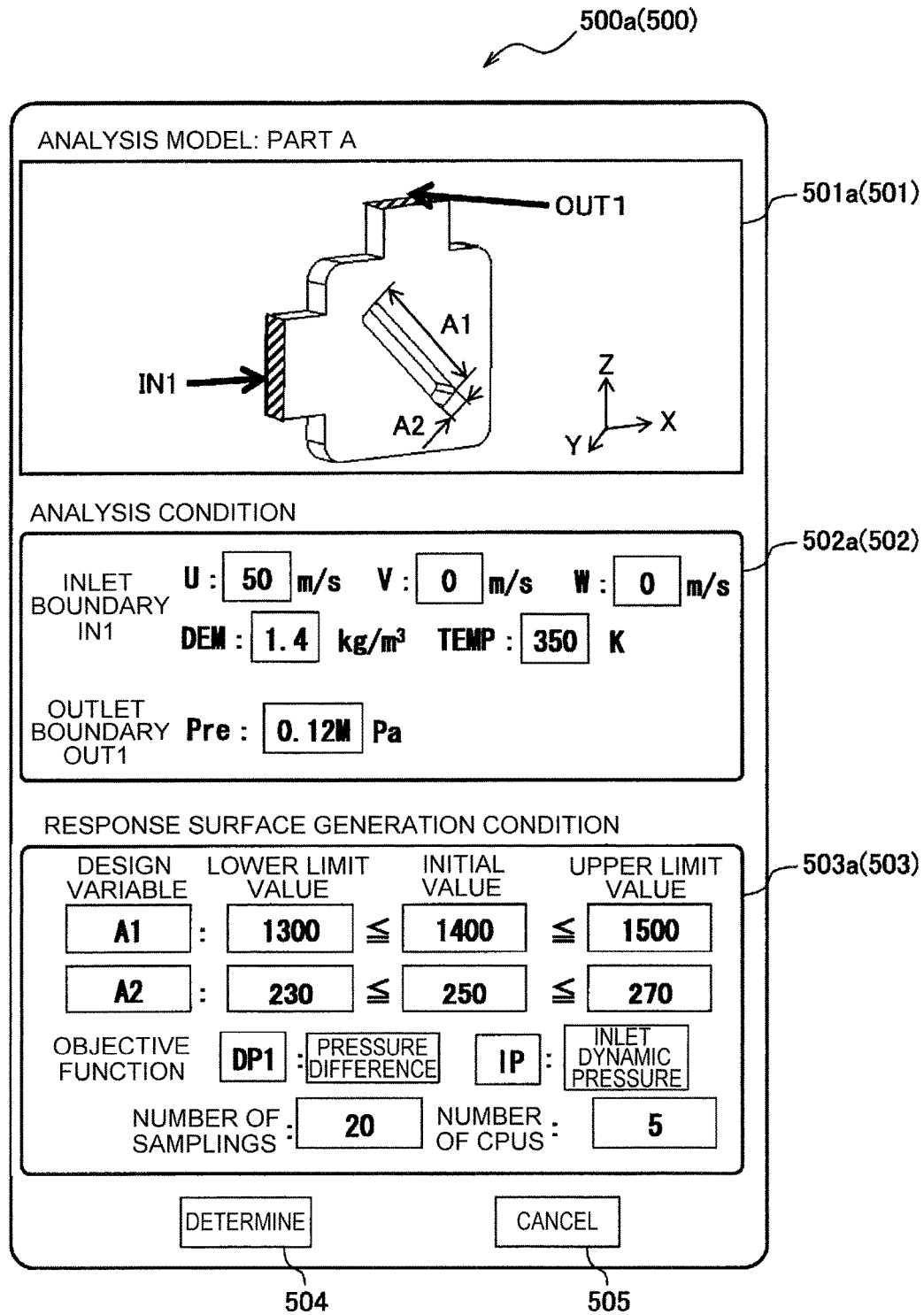
FIG. 5 is a diagram illustrating an example of the analysis information input screen regarding a part A.
Figure 6:
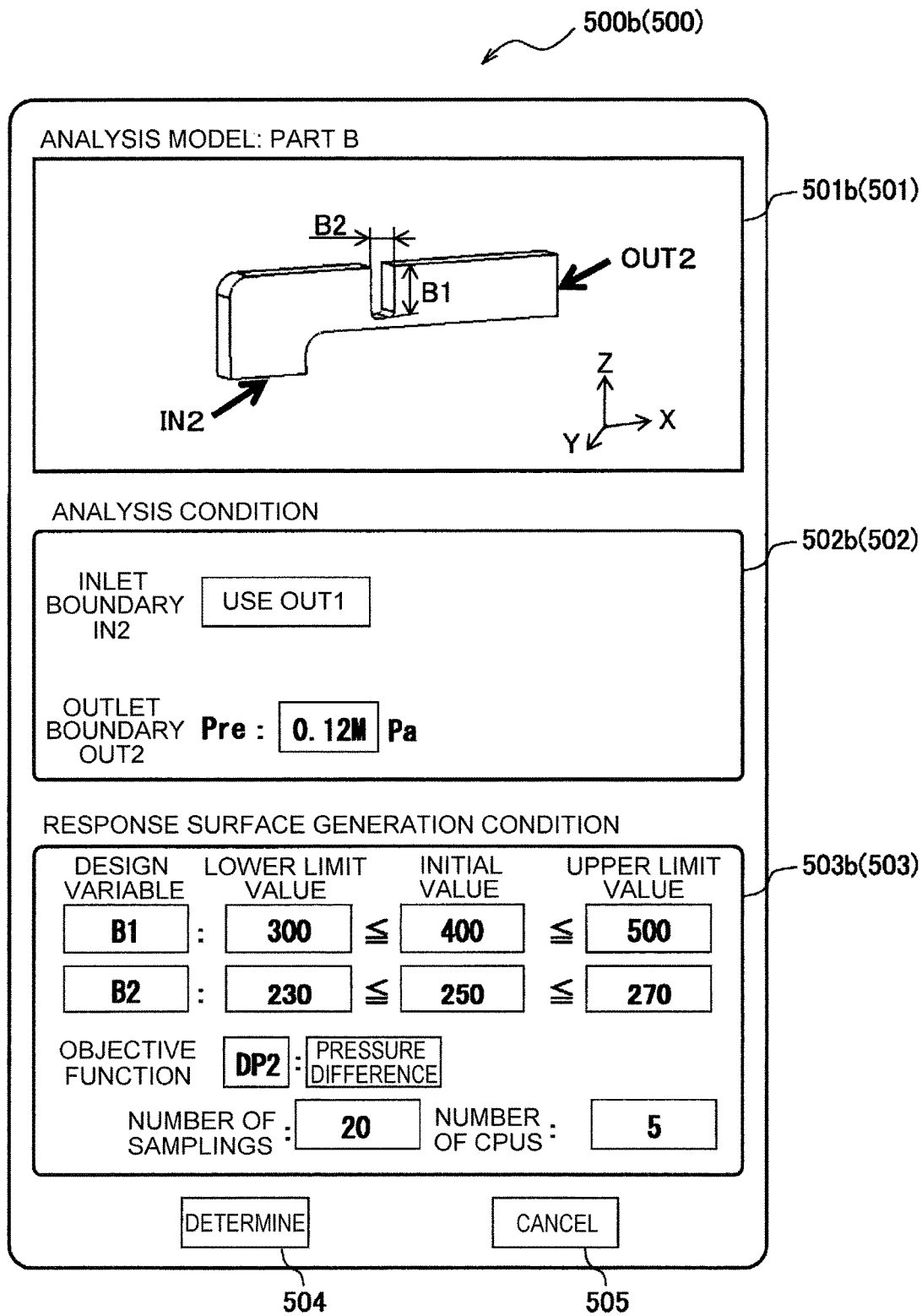
FIG. 6 is a diagram illustrating an example of the analysis information input screen regarding a part B.

FIGS. 5 and 6 are diagrams illustrating an example of the analysis information input screen according to the present embodiment.

A designer inputs information of an analysis model regarding a structure which is an analysis target, information regarding an analysis condition, or information of a response surface generation condition via the analysis information input screen 500.

In addition, although, in the present embodiment, a different analysis information input screen 500 is displayed for each divided part, information regarding all the divided parts may be displayed on a single analysis information input screen 500.

FIG. 5 is a diagram illustrating an example of the analysis information input screen regarding the part A.

The analysis information input screen 500a (500) includes an analysis model information input area 501a (501), an analysis condition input area 502a (502), a response surface generation condition input area 503a (503), a determination button 504, and a cancelation button 505.

The analysis information input screen 500a is an analysis information input screen 500 which targets the part A which is an upstream side part of the machine structure 400 of FIG. 4.

The analysis model information input area 501 is an area to which model information regarding each part is input, and, in the example of FIG. 5, "IN1" is set as an inlet boundary of the part A and "OUT1" is set as an outlet boundary. In addition, the sizes "A1" and "A2" of an opening portion of the part A are input as design variables.

The analysis condition input area 502 is an area to which information required for analysis (fluid analysis in the present embodiment) is input, and, in the example of FIG. 5, "50 m/s" is input in a flow velocity "U" in an X direction, "0 m/s" is input in a flow velocity "V" in a Y direction, and 0 m/s is input in a flow velocity "W" in a Z direction, at the inlet boundary "IN1". In addition, "1.4 kg/m³" is input in a fluid density "DEN", and "350K" is input in a temperature "TEMP", at the inlet boundary "IN1". Further, "0.12 MPa" is input as an outlet pressure (Pre) at the outlet boundary "OUT1".

The response surface generation condition input area 503 is an area to which a condition for generating a response surface in each part is input, and, in the example of FIG. 5, "lower limit value 1300", "initial value 1400", and "upper limit value 1500" are input as a condition of a design variable "A1", and, "lower limit value 230", "initial value 250", and "upper limit value 270" are input as a condition of a design variable "A2". In addition, an objective function calculated in the part A is defined in which a pressure difference is input as a variable name "DP1" and an inlet dynamic pressure is input as a variable name "IP". Further, the number "20" of samplings, and the number "5" of CPUs performing the fluid analysis process are input. The number of samplings will be described later.

After finishing the inputs to the respective input areas 501 to 503, the designer selects and inputs the determination button 504 such that the input analysis information is stored in the database 20.

In addition, when the designer selects and inputs the cancelation button 505, the input information to the respective input areas 501 to 503 is canceled.

FIG. 6 is a diagram illustrating an analysis information input screen targeting the part B which is a downstream side part of the machine structure 400.

In the same manner as the analysis information input screen 500a of FIG. 5, the analysis information input screen 500b (500) also includes an analysis model information input area 501b (501), an analysis condition input area 502b (502), a response surface generation condition input area 503b (503), a determination button 504, and a cancelation button 505.

In the example of the analysis model information input area 501b shown in FIG. 6, an inlet boundary "IN2" and an outlet boundary "OUT2" are set. In addition, the sizes "B1" and "B2" of a groove portion of the part B are set as design variables.

In the example of FIG. 6, use of values of the outlet boundary "OUT1" of the part A as values of the inlet boundary "IN2" is input in the analysis condition input area 502b. Here, the "values" are respective values of the flow velocity in the X direction, the flow velocity in the Y direction, the flow velocity in the Z direction, the fluid density, the temperature, and the outlet pressure. In addition, "0.12 MPa" is input as output pressure at the outlet boundary "OUT2".

In addition, in the example of FIG. 6, in the response surface generation condition input area 503, "lower limit value 300", "initial value 400", and "upper limit value 500" are input as a condition of a design variable "B1", and, "lower limit value 230", "initial value 250", and "upper limit value 270" are input as a condition of a design variable "B2". In addition, in relation to an objective function calculated in the part B, a pressure difference is input as a variable name "DP2", and the number "20" of samplings and the number "5" of CPUs performing the process are input.

[Objective Function Value Calculation Information Input Process]

Figure 7:
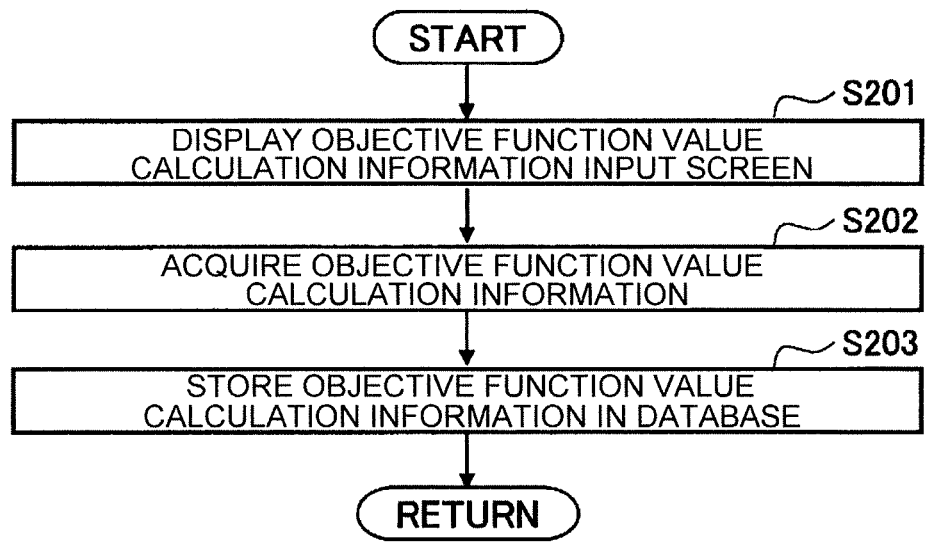
FIG. 7 is a flowchart illustrating detailed procedures of an objective function value calculation information input process according to the present embodiment.

FIG. 7 is a flowchart illustrating detailed procedures of the objective function value calculation information input process (S200) according to the present embodiment.

First, the display processing unit 16 displays an objective function value calculation information input screen 800 described later with reference to FIG. 8 on the display section 40 (S201).

In addition, the input processing unit 11 acquires objective function value calculation information which is input to the objective function value calculation information input screen 800 via the input section 30 (S202) and stores the acquired objective function value calculation information in the database 20 (S203).

(Objective Function Value Calculation Information Input Screen)

Figure 8:
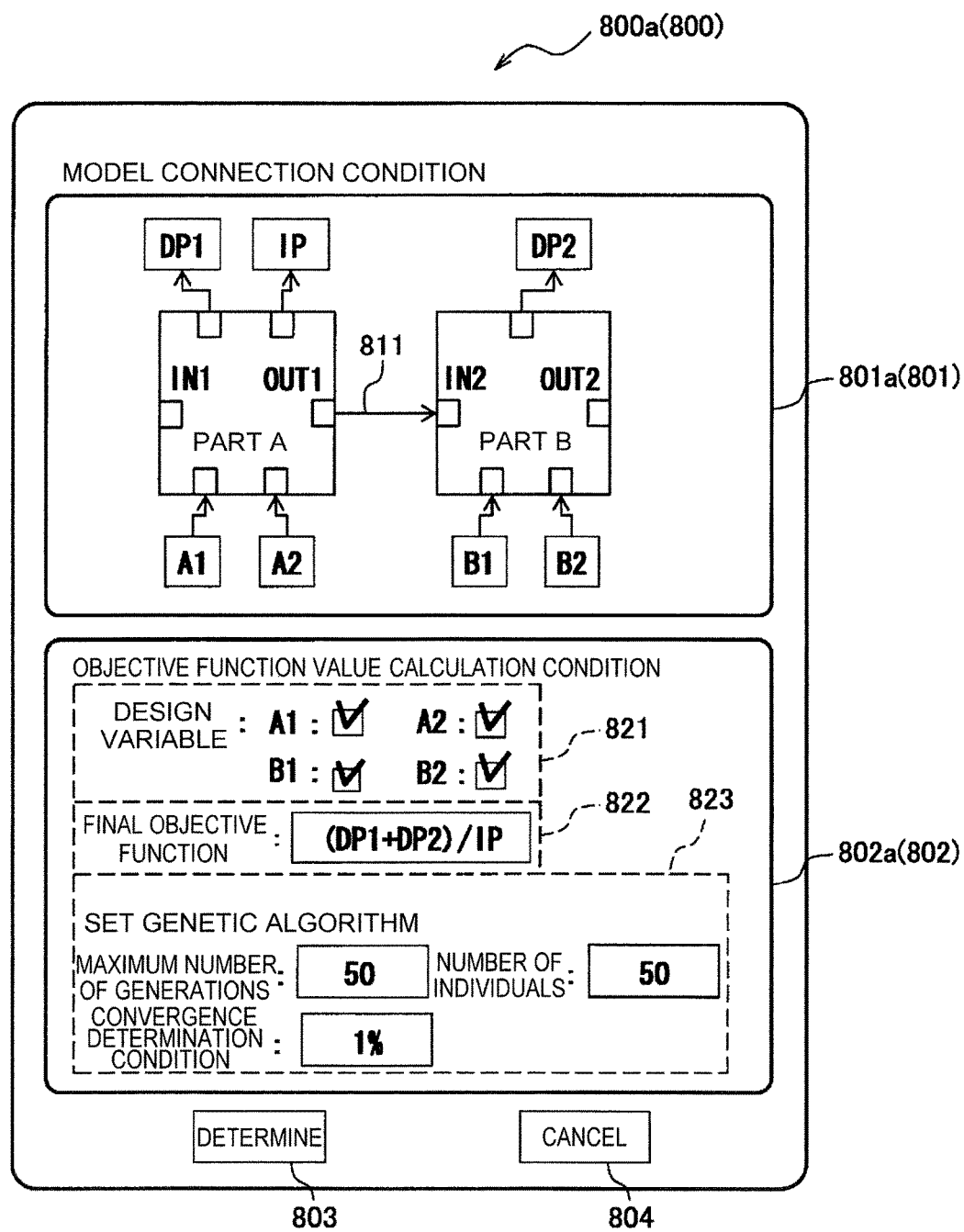
FIG. 8 is a diagram illustrating an example of the objective function value calculation information input screen according to the present embodiment (two divisions).

FIG. 8 is a diagram illustrating an example of the objective function value calculation information input screen according to the present embodiment.

The objective function value calculation information input screen 800a (800) includes a model connection condition input area 801a (801), an objective function value calculation condition input area 802a (802), a determination button 803, and a cancelation button 804.

In the model connection condition input area 801a, a relationship between the part A and the part B is displayed in a simplified block form, and information regarding the part A and the part B is input. In relation to the part A, according to the information input through the analysis information input process in step S100 (that is, input on the analysis information input screen 500a of FIG. 5), the inlet boundary "IN1", the outlet boundary "OUT1", the design variables "A1" and "A2", the objective functions "DP1" and "IP" of the part A are displayed. Similarly, according to the information input through the analysis information input process in step S100 (that is, input on the analysis information input screen 500b of FIG. 6), the inlet boundary "IN2", the outlet boundary "OUT2", the design variables "B1" and "B2", the objective function "DP2" of the part B are displayed. Here, referring to FIG. 4, in the machine structure 400, the part A is connected to the part B via the connection portion 401, and thus the outlet boundary "OUT1" of the part A is connected to the inlet boundary "IN2" of the part B. For this reason, a connection between the outlet boundary "OUT1" of the part A and the inlet boundary "IN2" of the part B is defined as in an arrow 811, and thereby the designer inputs the connection relationship.

The objective function value calculation condition input area 802 is an area to which conditions for calculating an objective function value described later are input. In the example of FIG. 8, the objective function value calculation condition input area 802 has a design variable setting area 821, a final objective function setting area 822, and an optimization algorithm setting area 823.

The design variable setting area 821 is an area for setting a design variable used to calculate an objective function value, and, in the example of FIG. 8, the design variables "A1", "A2", "B1" and "B2" of the part A and the part B are displayed, and a check indicating that the design variable is used as a design variable in calculation of an objective function value is input in the check box, thereby setting the design variables.

The final objective function setting area 822 is an area for setting a final objective function which is a desired objective function, and, in the example of FIG. 8, "(DP1+DP2)/IP" indicating a total pressure loss coefficient of the part A and the part B is input as an objective function.

The optimization algorithm setting area 823 is an area for setting information regarding an optimization algorithm which is used, and, in the example of FIG. 8, a "genetic algorithm" is used as the optimization algorithm, and "maximum number 50 of generations" and "number 50 of individuals" are input as conditions of the genetic algorithm, and "convergence determination condition 1%" is input.

[Fluid Analysis Process]

Figure 9:
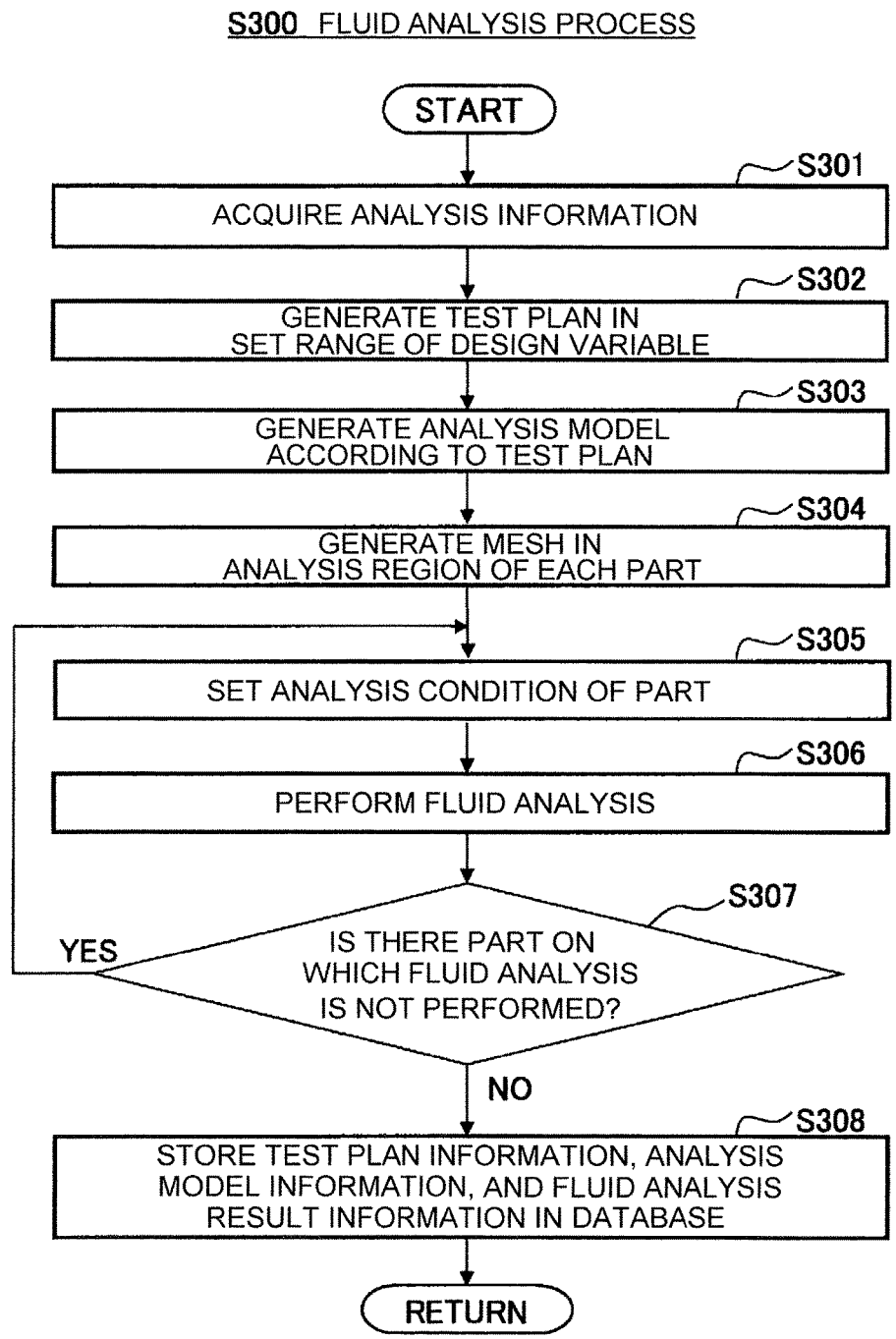
FIG. 9 is a flowchart illustrating detailed procedures of a fluid analysis process according to the present embodiment.

FIG. 9 is a flowchart illustrating detailed procedures of the fluid analysis process (S300) according to the present embodiment.

First, the analysis control unit 12 acquires the analysis information which has been acquired through the analysis information input process in step S100, from the database 20 (S301).

Next, the analysis control unit 12 generates a test plan in a set range of the design variable according to the response surface generation condition of each of the part A and the part B in the acquired analysis information (S302). A specific example of step S302 will be described with reference to FIGS. 5 and 6.

The analysis control unit 12 generates test plans corresponding to the number of samplings which is input to the response surface generation condition input area 503 with respect to the respective design variables ("A1", "A2", "B1", and "B2"). Here, an LHS method is used as the test plan. As shown in FIGS. 5 and 6, in the example of the present embodiment, the number of samplings is "20" in both the part A and the part B.

In relation to the part A, an example of the test plan generated using the LHS method is shown in Table 1.

TABLE 1

|  | A1 | A2 |
| --- | --- | --- |
| Test plan 1 | 1331.57 | 257.36 |
| Test plan 2 | 1436.84 | 240.52 |
| Test plan 3 | 1478.94 | 246.84 |
| Test plan 4 | 1352.63 | 230 |
| Test plan 5 | 1373.68 | 259.47 |
| Test plan 6 | 1342.10 | 244.73 |
| Test plan 7 | 1384.21 | 251.05 |
| Test plan 8 | 1415.78 | 261.57 |
| Test plan 9 | 1321.05 | 265.78 |
| Test plan 10 | 1363.15 | 267.89 |
| Test plan 11 | 1468.42 | 255.26 |
| Test plan 12 | 1405.26 | 234.21 |
| Test plan 13 | 1300 | 248.94 |
| Test plan 14 | 1457.89 | 232.10 |
| Test plan 15 | 1426.31 | 253.15 |
| Test plan 16 | 1310.52 | 236.31 |
| Test plan 17 | 1394.73 | 242.63 |
| Test plan 18 | 1500 | 238.42 |
| Test plan 19 | 1447.36 | 270 |
| Test plan 20 | 1489.47 | 263.68 |

As shown in Table 1, test plans of Test plan 1 to Test plan 20 are generated according to the LHS method on the basis of the number "20" of samplings. At this time, each of the values of the design variables "A1" and "A2" is generated so as not to exceed the lower limit value and the upper limit value in the response surface generation condition input area 503a of FIG. 5. That is, the values of the design variables "A1" and "A2" are generated in the set range of the design variables.

The analysis control unit 12 generates the same test plans for the design variables "B1" and "B2" of the part B.

Next, the analysis control unit 12 generates an analysis model with a shape corresponding to a design variable value of each test plan according to the generated test plans (S303). Here, the analysis model is a shape model for the part A and the part B.

For example, in the part A, the analysis control unit 12 generates an analysis model of the part A which has "1331.57" as a value of "A1" and "257.36" as a value of "A2" in Test plan 1 of Table 1, and generates twenty analysis models having the values of test plans of Table 1 for each of the part A and the part B in this way.

Successively, the analysis control unit 12 performs mesh generation for an analysis region of each analysis model of the part A and the part B, generated in step S303 (S304). In the example of the present embodiment, meshes are generated for a total of forty analysis models of twenty in the part A and twenty in the part B. In the example of the present embodiment, since an analysis target is a fluid, a mesh is desirably generated according to a finite volume method, but a mesh may be generated according to a finite element method.

In addition, the analysis control unit 12 first sets analysis conditions such as an inlet boundary condition and an outlet boundary condition for the analysis model of the upstream side part A in each analysis model of the part A and the part B for which the meshes are generated in step S304 (S305). The inlet boundary condition and the outlet boundary condition are conditions which are input in the analysis condition input area 502 or the like of FIG. 5 or 6.

Next, the analysis control unit 12 performs a fluid analysis on the analysis model (of the part A here) for which the analysis conditions are set in step S305 (S306). At this time, the analysis control unit 12 performs the fluid analysis with parallel calculation using the number of CPUs which is input through the analysis information input process in step S100. Referring to the response surface generation condition input area 503 of FIG. 5, "5" is input as the number of CPUs, and thus the analysis control unit 12 performs parallel calculation of the fluid analysis in five CPUs.

In addition, here, targets on which the fluid analysis is performed are the flow velocity in the X direction, the flow velocity in the Y direction, the flow velocity in the Z direction, the fluid density, and the temperature which are set in the analysis condition input area 502 of FIG. 5.

Further, as a result of the fluid analysis in step S306, an amount of eddy flow is calculated from the flow velocity, the fluid density, and the like by the analysis control unit 12.

In addition, the analysis control unit 12 determines whether or not there is a part on which the fluid analysis process is not performed (S307).

As a result of step S307, if there is a part on which the fluid analysis process is not performed (S307→YES), the analysis control unit 12 returns to the process in step S305 and performs setting of an analysis condition and the fluid analysis on the part on which the fluid analysis process is not performed.

For example, in the present embodiment, since the fluid analysis is not performed on the part B, the analysis control unit 12 returns to the process in step S305 and sets analysis conditions such as the inlet boundary condition and the outlet boundary of the part B. At this time, in light of the analysis conditions of the part B input through the analysis information input process in step S100, that is, according to the information of the analysis condition input area 502b of FIG. 6, a physical quantity in the outlet boundary "OUT1" which is obtained through the fluid analysis of the part A is set as the analysis condition (physical quantity) of the inlet boundary "IN2" of the part B, and then the fluid analysis of the part B is performed.

As a result of step S307, if there is no part on which the fluid analysis process is not performed (S307→NO), the analysis control unit 12 stores the information (test plan information) regarding the test plans generated in step S302, the information (analysis model information) regarding each analysis model generated in step S303, and the information (fluid analysis result information) regarding the result of the fluid analysis generated in step S306, in the database 20 (S308).

[Parameterization Process and Response Surface Generation Process]

Figure 10:
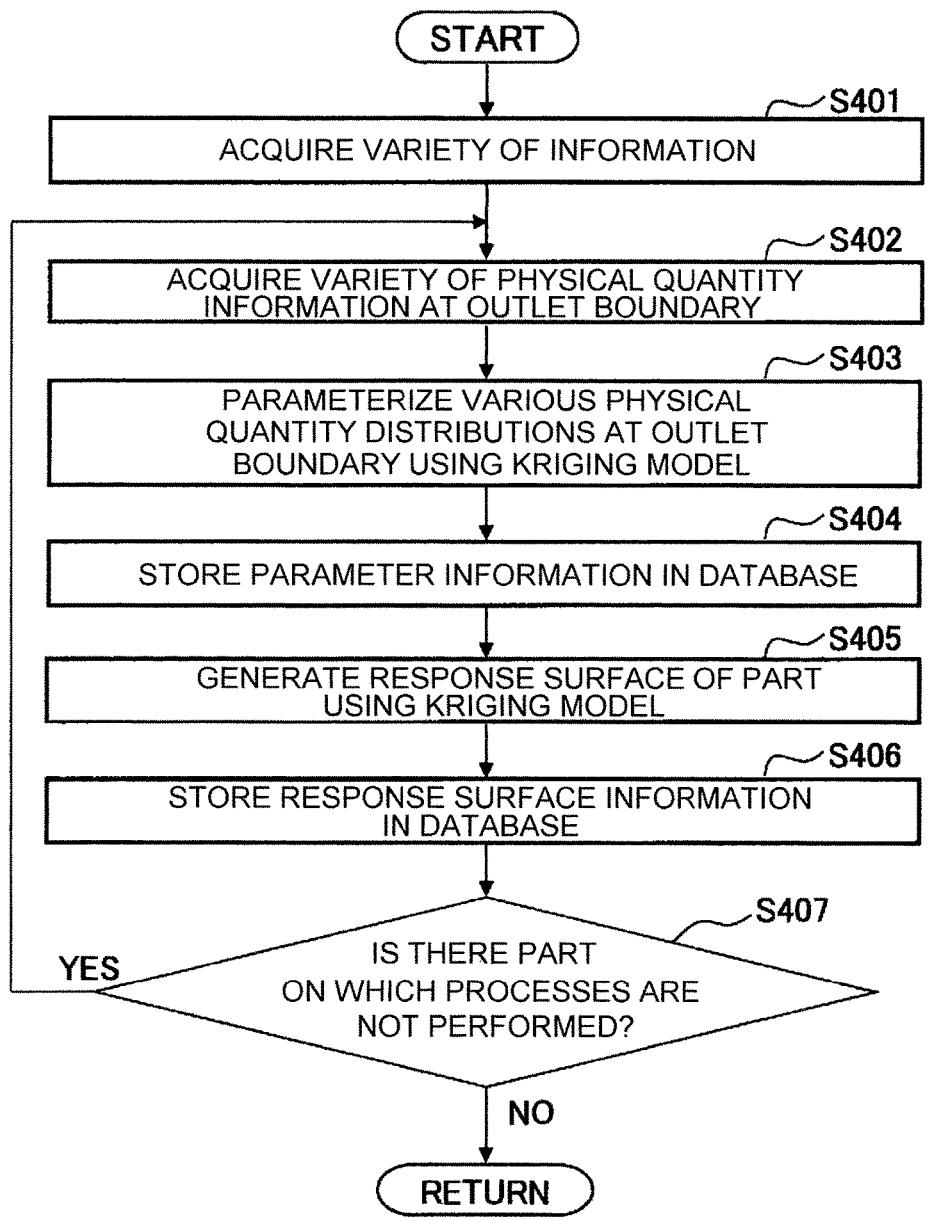
FIG. 10 is a flowchart illustrating detailed process procedures of a parameterization process and a response surface generation process according to the present embodiment.

FIG. 10 is a flowchart illustrating detailed process procedures of the parameterization process and the response surface generation process (S400) according to the present embodiment. In addition, in FIG. 10, steps S401 to S404 correspond to the parameterization process, and steps S405 and S406 correspond to the response surface generation process.

First, the connection information generating unit 13 acquires a variety of information such as the analysis information input in step S100, the objective function value calculation information input in step S200, and the test plan information, the analysis model information and the fluid analysis result information generated in step S300, from the database 20 (S401).

Next, the connection information generating unit 13 refers to the objective function value calculation information input in step S200 and acquires a variety of physical quantity information of the outlet boundary of the upstream side part from the fluid analysis result information (S402). In other words, since it is understood that the upstream side part is the part A from the information input in the model connection condition input area 801 of FIG. 8, the connection information generating unit 13 acquires a variety of physical quantity information such as a flow velocity in each of X, Y and Z directions, a fluid density, temperature, and an amount of eddy flow at the connection portion of the upstream side part, that is, the outlet boundary "OUT1" of the part A, from the fluid analysis result information. Here, the flow velocity, the fluid density, the temperature, and the amount of eddy flow are distribution information at the outlet boundary of the part A. Hereinafter, the flow velocity in each of X, Y and Z directions, the fluid density, the temperature, and the amount of eddy flow are collectively appropriately referred to as physical quantities.

In addition, as described above, since the test plans corresponding to the number "20" of samplings are generated, the number of the distribution information pieces acquired in step S402 is twenty for each physical quantity, and thus a total of twelve distribution information pieces occur.

Successively, the connection information generating unit 13 parameterizes (distribution parameters) a variety of physical quantity distributions such as the flow velocity distribution, the fluid density distribution, the temperature distribution, and the eddy flow distribution at the outlet boundary "OUT1" of the upstream side part (here, the part A) acquired in step S402 by using the Kriging model (S403).

Figure 11:
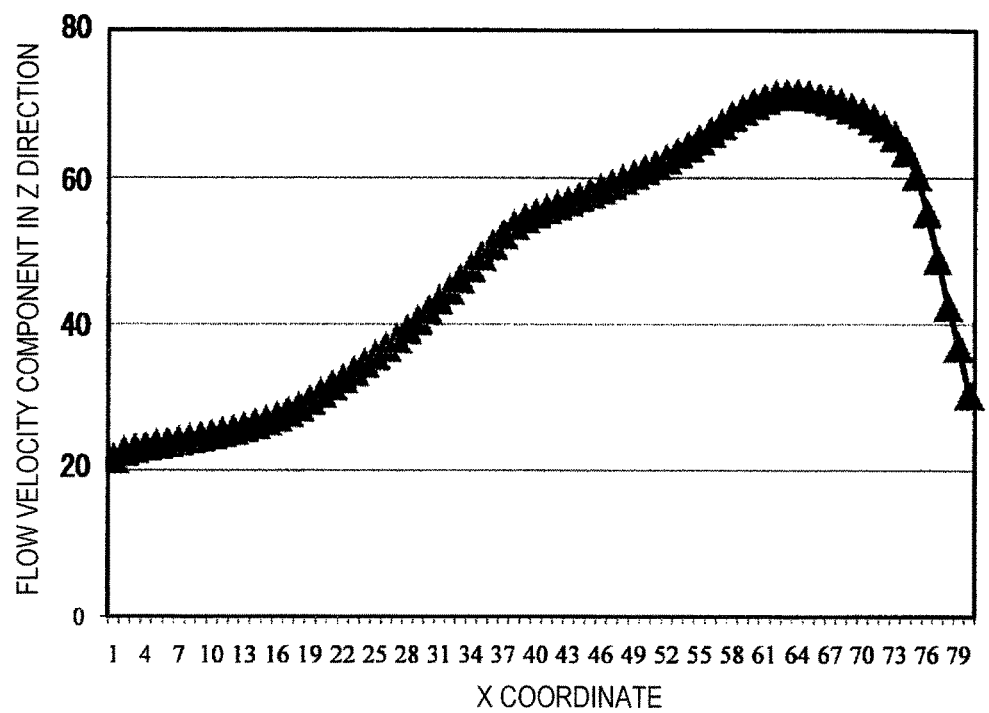
FIG. 11 is a diagram illustrating an example of the flow velocity distribution regarding a Z direction at an outlet boundary of the part A.

FIG. 11 is a diagram illustrating an example of the flow velocity distribution regarding the Z direction at the outlet boundary of the part A.

In FIG. 11, the transverse axis expresses an X coordinate, and the longitudinal axis expresses a velocity component in the Z direction. Here, the X coordinate is the X coordinate in FIG. 5. As shown in FIG. 11, the velocity component in the Z direction forms a distribution for the X coordinate.

In step S403, the physical quantity distribution as shown in FIG. 11 is parameterized, and thereby information given to the downstream part (part B) is reduced.

Here, procedures of parameterizing the flow velocity distribution as shown in FIG. 11 by using the Kriging model will be described as an example of step S403.

First, the connection information generating unit 13 sets the X coordinate as a master variable x (attribute value) and the flow velocity component in the Z direction as a dependent variable y. Here, the Kriging model y(x) is defined by the following Equation (1). Here, the design variables "A1" and "A2" of the part A are set as a master variable, and the flow velocity in the Z direction is set as a dependent variable.

[Math. 1]

$$y(x) = \mu + z(x) \tag{1}$$

Here, x indicates a master variable, μ indicates an average value of the objective function (here, the flow velocity component in the Z direction), and z(x) indicates a variance for the average value. μ is given by Equation (2), and z(x) is given by Equation (3). Here, x and y are vectors.

[Math. 2]

$$\mu = \frac{I^T R^{-1} y}{I^T R^{-1} I} \tag{2}$$

[Math. 3]

$$z(x) = r^T(x) \cdot R^{-1}(y - \mu I) \tag{3}$$

Here, I is a unit vector, and R is a correlation matrix. In addition, y is a vector which has a value of the objective function for a test plan point as an element. A component of the correlation matrix R is defined by Equation (4).

[Math. 4]

$$r_{ij} = \exp\left\{-\sum_{k=1}^{n} \theta^k |x_i^k - x_j^k|^2\right\} \tag{4}$$

θ of Equation (4) is referred to as a Kriging coefficient. The Kriging coefficient is a parameter which characterizes an equation. In Equation (4), the superscript k indicates an element number of the design variable. For example, in analysis of the part A of the present embodiment, the design variables are two, that is, "A1" and "A2", and thus values of k are 1 and 2 (that is, n=2 in Equation (4)). The subscripts i and j indicate elements of sampling points (elements of the test plan). In other words, $x_i$ and $x_j$ indicate test plan points, and, specifically, are values of "A1" and "A2" of each of Test plan 1, Test plan 2, . . . , of Table 1. In the example of the present embodiment, since the number of samplings is "20", i and j are integers of "1" to "20". Further, n indicates the number of design variables (x). In the example of the present embodiment, n is "2". When $r_{ij}$ of Equation (4) is expressed as a function of the master variable x, r(x) is defined by Equation (5) for the given design parameter x.

[Math. 5]

$$r(x) = \exp\left\{-\sum_{k=1}^{n} \theta^k |x^k - x_i^k|^2\right\} \tag{5}$$

As described above, the Kriging coefficient may be set for each master variable. That is, if there are two master variables, there are two Kriging coefficients $\theta^1$ and $\theta^2$, and if there are three master variables, there are three Kriging coefficients $\theta^1$, $\theta^2$ and $\theta^3$. Here, since there are two master variables "A1" and "A2", there are two Kriging coefficients for a single r(x). Two Kriging coefficients for a single dependent variable are referred to as a pair, and are referred to as two when the Kriging coefficients ($\theta^1$ and $\theta^2$) are counted individually.

The Kriging coefficient is determined so as to maximize the following Equation (6) using the Kriging coefficient itself as a design parameter.

[Math. 6]

$$Ln = -\frac{m}{2}\ln(\sigma^2) - \frac{1}{2}\ln(|R|) \tag{6}$$

Here, m indicates the number of samplings (here, 20), and σ is defined by the following Equation (7).

[Math. 7]

$$\sigma^2 = \frac{(y - \mu I)^T R^{-1}(y - \mu I)}{m} \tag{7}$$

A solution of the Kriging coefficient (θ) which maximizes Ln of Equation (6) is obtained using the optimization algorithm, and is assumed to be obtained using the genetic algorithm (a real-coded genetic algorithm) in the present embodiment.

First, the connection information generating unit 13 determines a hundred (fifty pairs of) Kriging coefficients at random as initial generations. A pair of Kriging coefficients is referred to as an individual in the genetic algorithm. A value of 50 pairs is based on the number of individuals in the objective function value calculation condition input area 802a.

Next, the connection information generating unit 13 calculates Ln from the determined hundred (fifty pairs of) Kriging coefficients and Equations (6), (7) and (4).

Thereby, the connection information generating unit 13 calculates hundred (fifty pairs of) Ln but is assumed to extract 20% of individuals (pairs of the Kriging coefficients) in descending order of the size of Ln. Here, high rank twenty (ten pairs of) Kriging coefficients are extracted.

Next, the connection information generating unit 13 performs crossing-over and mutation on the Kriging coefficients which are extracted individuals (pairs) on the basis of a rule of the real-coded genetic algorithm so as to generate a new hundred (fifty pairs of) individuals (Kriging coefficients) as the next generation, and calculates Ln from Kriging coefficients as the newly generated individuals and Equations (6), (7) and (4). The response surface generating unit 14 calculates Ln while increasing the number of individuals until a variation between the best value of the newly generated Ln and the best value of Ln of the previous generation converges within 1% or until the number of calculated generations arrives at the maximum number 50 of generations. Here, 1% as a convergence condition and the maximum number 50 of generations are the information input in the optimization algorithm setting area 823 of FIG. 8.

If the convergence condition is satisfied or the maximum number of generations arrives, the connection information generating unit 13 calculates the best pair of Kriging coefficients among them, and finishes the calculation. In other words, two Kriging coefficients are finally calculated for a single dependent variable y in the example of the present embodiment. Here, the best indicates a Kriging coefficient in which Ln of Equation (6) is the maximum.

Similarly, the connection information generating unit 13 calculates Kriging coefficients with regard to the other flow velocity components (the flow velocity components in the X direction and Y direction), the fluid density, the temperature, and an amount of eddy flow at the outlet boundary of the part A. Here, Kriging coefficients are calculated with regard to twenty pairs, corresponding to the number of samplings, of flow velocity components (X, Y and Z directions), fluid densities, temperatures, and amounts of eddy flow. Since a pair of Kriging coefficients is finally calculated for each dependent variable y (the flow velocity components in the X direction, Y direction and Z direction, the fluid density, the temperature, and an amount of eddy flow), a total of six pairs of (twelve) Kriging coefficients are calculated.

When the process in step S403 finishes, the connection information generating unit 13 stores the Kriging coefficients (six pairs, that is, twelve in total) regarding each physical quantity (the flow velocity components in the X direction, Y direction and Z direction, the fluid density, the temperature, and an amount of eddy flow) in the database 20 as parameterization information in which the Kriging coefficient is a parameter (S404).

Here, a physical quantity distribution generally leads to a complex equation. Therefore, if each physical quantity distribution at the connection portion of the part is given to the downstream part as it is, an objective function or a calculation load of physical quantity increases in the downstream part. Therefore, in the present embodiment, a physical quantity distribution at the connection portion of the part is parameterized so as to be simplified, and thereby an objective function or a calculation load of physical quantity is reduced in the downstream part. That is, if a machine structure which is an analysis target is merely divided, a calculation load is still large, but, in the present embodiment, a physical quantity distribution at the connection portion of the part is parameterized, and thereby an overall calculation load is reduced.

Next, the response surface generating unit 14 generates an objective function (response surfaces of the pressure difference "DP1" and the inlet dynamic pressure "IP" input in the response surface generation condition input area 503*a* of FIG. 5) of the part (here, the part A) which is a processing target by using the Kriging model on the basis of the variety of information of the part A (S405). Here, the information which is used is the analysis information input in step S100 of FIG. 3, the objective function value calculation information input in step S200 of FIG. 7, the test plan information, the analysis model information, and the fluid analysis result information generated and calculated in step S300, and the parameterization information calculated in step S404.

Here, generation of a response surface of the pressure difference "DP1" of the part A will be described as an example. In this example, the response surface generating unit 14 generates a response surface by using the design variables "A1" and "A2" as a master variable x and the pressure difference "DP1" as a dependent variable y.

Here, the number of samplings of the part A is 20 from the analysis condition input area 502*a* of FIG. 5. Also here, a Kriging coefficient is calculated (parameterization of a response surface) using the Kriging model as means for generating a response surface, using Equations (1) to (7) described above, and further using the genetic algorithm. That is, the response surface generating unit 14 calculates a Kriging coefficient according to the procedures described in step S403.

Similarly, the response surface generating unit 14 generates a response surface by using the inlet dynamic pressure IP, and the parameter of each physical quantity (the flow velocity components (in the X direction, Y direction and Z direction), the fluid density, the temperature, and an amount of eddy flow) calculated in steps S402 and S403 as a dependent variable y and using Equations (1) to (7), and calculates a Kriging coefficient. Here, the parameter which is parameterized in steps S402 and S403 is the Kriging coefficient which is calculated in steps S402 and S403. In addition, parameters of the flow velocity components in the X direction, Y direction and Z direction, the fluid density, the temperature, and an amount of eddy flow calculated in step S403 are obtained by parameterizing the respective physical quantity distributions, but the Kriging coefficients calculated in step S405 are obtained by further parameterizing the parameters which are obtained by parameterizing the distributions, in relation to the design variables "A1" and "A2".

In addition, the response surface generating unit 14 stores each Kriging coefficient calculated in step S405 in the part (here, the part A) which is a processing target in the database 20 as response surface information (S406). Here, in a case where the part A is a processing target part, the Kriging coefficients stored as response surface information are eight pairs of, that is, a total of sixteen Kriging coefficients, for each of the pressure difference "DP1", the inlet dynamic pressure "IP" (objective function parameters), the flow velocities in the X direction, Y direction and Z direction, the fluid density, the temperature, and an amount of eddy flow calculated in step S405.

After step S406, the response surface generating unit 14 determines whether or not there is a part on which the processes in steps S402 to S406 are not performed (S407).

As a result of step S407, if there is a part on which the processes are not performed (S407→YES), the connection information generating unit 13 returns to the process in step S402, and performs the processes in steps S402 to S406 on the downstream part (if a processing target is the part A, the adjacent downstream part is the part B) adjacent to the part which is a processing target.

As a result of step S407, if there is no part on which the processes are not performed (S407→NO), the response surface generating unit 14 finishes the parameterization process and the response surface generation process.

Here, when the processes in steps S402 to S406 on the part B are summarized, it can be seen that the inlet boundary "IN2" of the part B is connected to the outlet boundary "OUT1" of the part A by referring to the information input in the model connection condition input area 801 of FIG. 8. In other words, a physical quantity at the outlet boundary "OUT1" of the part A is given to the inlet boundary "IN2" of the part B. In the present embodiment, the parameter information generated in step S403 is also input information to the part B, that is, a master variable, and, in addition to the design variables "B1" and "B2", parameters (Kriging coefficients calculated in step S405) of the flow velocity components in the X direction, Y direction and Z direction, the fluid density, the temperature, and an amount of eddy flow are master variables x. In other words, since the number of the master variables is eight, the number of Kriging coefficients calculated from a single dependent variable is eight. In addition, the response surface generating unit 14 generates a response surface by using the pressure difference "DP2" input as an objective function in the response surface generation condition input area 503 of FIG. 6 as the dependent variable y. Here, the number of samplings of the part B, that is, an analysis result is 20 which is input in the response surface generation condition input area 503 of FIG. 6. The response surface generating unit 14 calculates a set of eight Kriging coefficients regarding the pressure difference "DP2", based on each of the above-described master variables x and the dependent variable y by using Equations (1) to (7) in step S405.

[Objective Function Value Calculation Process]

Figure 12:
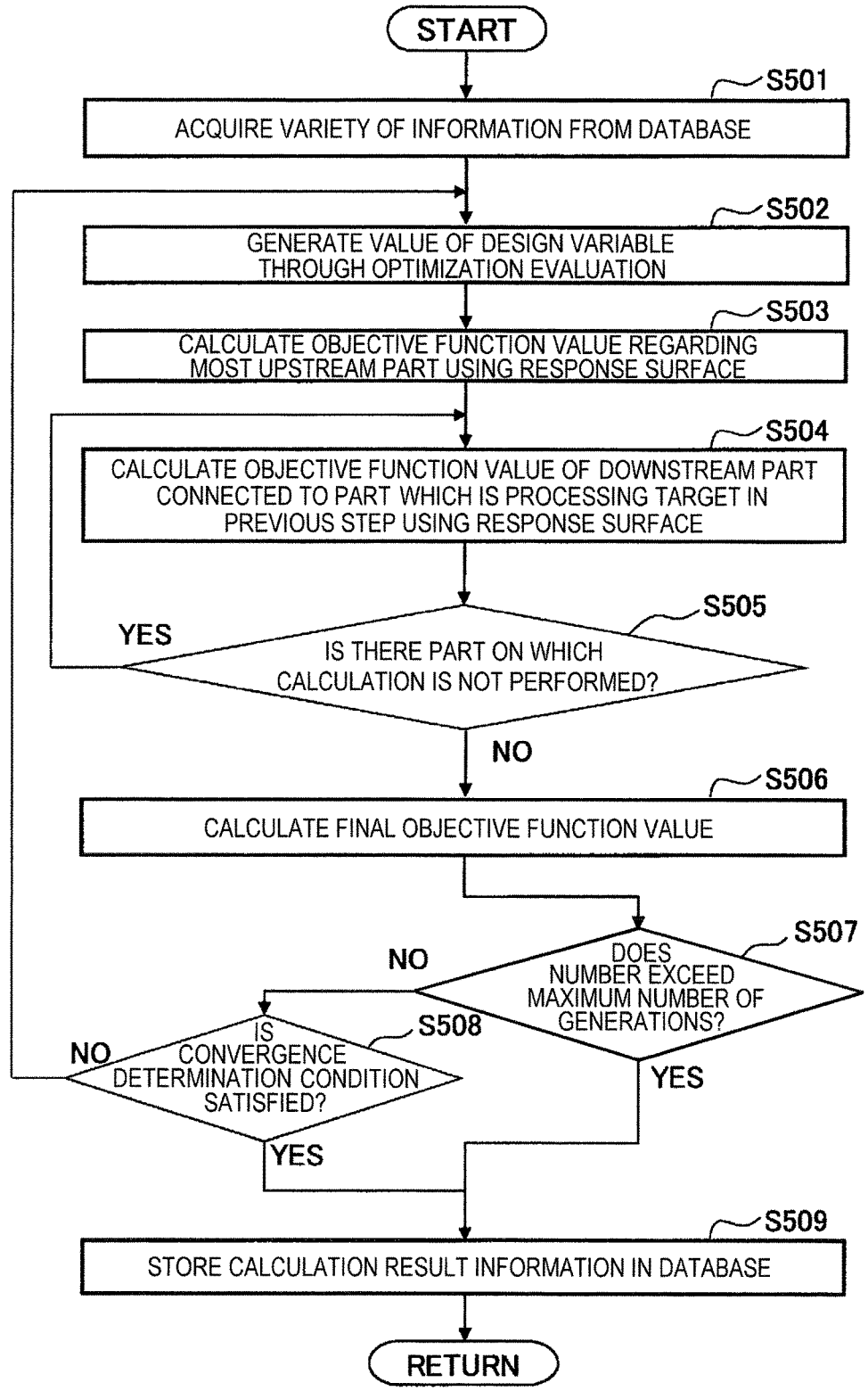
FIG. 12 is a flowchart illustrating detailed procedures of an objective function value calculation process according to the present embodiment.

FIG. 12 is a flowchart illustrating detailed procedures of the objective function value calculation process (S500) according to the present embodiment.

First, the objective function value calculating unit 15 sets "1" as an initial value of the number of generations, and acquires a variety of information required for the objective function value calculation process from the database 20 (S501). Here, the acquired information is the analysis information input in step S100, the objective function value calculation information input in step S200, the test plan information, the analysis model information and the fluid analysis result information generated in step S300, and the parameter information and the response surface information generated in step S400.

Next, the objective function value calculating unit 15 generates values of design variables for calculating an objective function value through optimization evaluation (S502). Hereinafter, the process in step S502 will be described in detail. In step S200, the design variables are "A1", "A2", "B1", and "B2" according to the information input in the design variable setting area 821 of FIG. 8. Here, a single objective genetic algorithm is used for an optimization evaluation method, and, the number of individuals is "50", the maximum number of generations is "50", the convergence determination condition is "1%" according to the information input in the optimization algorithm setting area 823. The objective function value calculating unit 15 first randomly generates, as initial generations, fifty sets of values of "A1", "A2", "B1", and "B2" between the upper limit value and the lower limit value of each design variable of the response surface generation condition input in the response surface generation condition input area 503 of FIG. 5 or 6 in step S100.

In subsequent steps S503 and S504, the objective function value calculating unit 15 sequentially assigns the parameters (Kriging coefficients) calculated in step S405 and the values of the design variables "A1", "A2", "B1", and "B2" generated in step S502 to Equations (1) to (5), thereby obtaining a specific value of y(x) in Equation (1).

In other words, the objective function value calculating unit 15 specifies the most upstream part by referring to the model connection condition input in the model connection condition input area 801 in step S200, and calculates an objective function value (a value of an objective function) regarding the part by using the values of the design variables determined in step S502 and further using the parameterized response surface obtained in step S405 (S503). Hereinafter, the process in step S503 will be described in detail. Based on the model connection condition, the most upstream part is the part A, the design variables are "A1" and "A2", the objective functions are the pressure difference "DP1" and the inlet dynamic pressure "IP", and the parameters (the Kriging coefficients calculated in step S405) of the respective physical quantities of the flow velocities in the X direction, Y direction and Z direction, the fluid density, the temperature, and an amount of eddy flow at the outlet boundary "OUT1" (that is, the connection portion 401 in FIG. 4).

The objective function value calculating unit 15 calculates each objective function value (a specific value of the objective function) in the following procedures. The objective function value calculating unit 15 acquires the response surface information corresponding to each dependent variable stored in the database 20 in step S406, that is, all of the pressure difference "DP1", the inlet dynamic pressure "IP", and the Kriging coefficients corresponding to the respective physical quantities of the part A from the database 20. In addition, the objective function value calculating unit 15 assigns each value (fifty values for each) of the design variables "A1" and "A2" generated in step S502 to the master variable x of Equation (5) for each dependent variable, and assigns the acquired Kriging coefficient to θ of Equation (5), thereby calculating values of r(x) of Equation (5) and $r_{ij}$ of Equation (4). In addition, the objective function value calculating unit 15 assigns the values of r(x) and $r_{ij}$ to Equations (3) and (2) which are solved with respect to y, thereby calculating a value of y(x).

Through the process in step S503, each of the pressure difference "DP1", the inlet dynamic pressure "IP", and the parameters (Kriging coefficients) of the physical quantities of the part A is calculated in fifties. Here, the reason why parameters (Kriging coefficients) are output when the parameters of the respective physical quantities are assigned to Equations (1) to (5) is that parameterization is further performed in step S405 on the basis of the parameters obtained when the physical quantity distributions are parameterized in step S403.

In addition, the value of each physical quantity is not designated as an objective function in the analysis information input screen 500a or the like of FIG. 5 but is calculated as an objective function value since it is required to calculate an objective function value of the subsequent part B.

In addition, the objective function value calculating unit 15 calculates an objective function value of the downstream part (here, the part B) connected to the part (here, the part A) which is a processing target in the previous steps, by using the parameterized response surface in the same manner as in step S503 (S504).

Hereinafter, the process in step S504 will be described in detail. In the example of the present embodiment, since a part which is a processing target in step S504 is the part B, the design variables regarding the part B are "B1" and "B2" according to the information input in the objective function value calculation condition input area 802 of FIG. 8 in step S200. In addition, since each physical quantity at the inlet boundary "IN2" is each physical quantity at the outlet boundary "OUT1" in the analysis condition input area 502b of FIG. 6, the parameters (Kriging coefficients) of the respective physical quantities calculated in step S503 are used as design variables. In addition, an objective function is the pressure difference "DP2" according to the information input in the response surface generation condition input area 503b of FIG. 6.

Therefore, the objective function value calculating unit 15 uses the values of the respective physical quantities calculated in step S503 as master variables in addition to fifty pairs of design variables "B1" and "B2" generated in step S502, and assigns the Kriging coefficients corresponding to the dynamic pressure difference "DP2" calculated in step S405 to Equations (1) to (5), thereby calculating fifty values of the dynamic pressure difference "DP2".

Here, a description will be made of a summary of the processes in steps S503 and S504.

When $X^A$ indicates design variables ("A1" and "A2") of the size regarding the part A, $X^B$ indicates design variables ("B1" and "B2") of the size regarding the part B, $Y^A$ indicates objective function values "DP1" and "IP" of the part A, $Y^{OUT1}$ indicates parameters (Kriging coefficients) of the respective physical quantities at the outlet boundary of the part A, and "$Y^B$" indicates an objective function value "DP2" of the part B, the objective function values "DP1" and "IP" of the part A are expressed by Equation (8) (corresponding to step S503).

$$Y^A = f^A(X^A) \qquad (8)$$

In addition, a value of each physical quantity at the outlet boundary of the part A is expressed by Equation (9) (corresponding to step S503). Here, as described above, $Y^{OUT1}$ indicates a Kriging coefficient.

$$Y^{OUT1} = f^A(X^A) \qquad (9)$$

In addition, the objective function value "DP2" of the part B is expressed by Equation (10) (corresponding to step S504).

$$Y^B = f^B(X^B, Y^{OUT1}) \qquad (10)$$

Here, "$f^A$" in Equation (8) indicates a response surface regarding the part A, and "$f^B$" in Equation (9) indicates a response surface regarding the part B. The Kriging coefficient is a parameter which characterizes "$f^A$" and "$f^B$".

As can be seen from Equation (10), the objective function value calculating unit 15 calculates an objective function value of the part B using the connection information $Y^{OUT1}$.

In addition, in a case where a part which is a processing target is not the most downstream part in step S504, the objective function value calculating unit 15 calculates a parameter (Kriging coefficient) of each physical quantity at a connection portion with a part located further on the downstream side than the part through the same process as in step S503. Further, in a case where a part which is a processing target is the most downstream part in step S504, the objective function value calculating unit 15 calculates only an objective function value.

In addition, the objective function value calculating unit 15 determines whether or not there is a part of which an objective function value is not calculated (S505).

As a result of step S505, if there is a part of which an objective function value is not calculated (S505→YES), the objective function value calculating unit 15 returns to the process in step S504, and calculates an objective function value regarding a part located still further on the downstream side.

As a result of step S505, if there is no part of which an objective function value is not calculated (S505→NO), a value of the final objective function (a final objective function value: objective value) which is input in the final objective function setting area 822 of FIG. 8 in step S200 is calculated (S506). With reference to FIG. 8, in the example of the present embodiment, a final objective function is a total pressure loss coefficient (DP1+DP2)/IP when the part A and the part B are connected to each other. The objective function value calculating unit 15 calculates fifty total pressure loss coefficients (DP1+DP2)/IP based on "DP1", "IP", and "DP2" each of which is calculated in fifties in steps S503 and S504.

Next, the objective function value calculating unit 15 determines whether or not the current number of generations exceeds the maximum number of generations (S507). The maximum number of generations is a value which is input in the optimization algorithm setting area 823 of FIG. 8 in step S200.

As a result of step S507, if the current number of generations does not exceed the maximum number of generations (S507→NO), the objective function value calculating unit 15 determines whether or not the convergence determination condition is satisfied (S508).

The convergence determination is performed depending on whether or not a value calculated based on a convergence determination equation of the following Equation (11) satisfies the convergence determination condition.

[Math. 8]

$$\varepsilon = \frac{|yc - ye|}{ye} \qquad (11)$$

Here, yc is the best value among fifty (fifty sets) final objective function values which are current individuals, and ye is the best value of an objective function value calculated hitherto.

If ε lies in the convergence determination condition (here, 1% input in the optimization algorithm setting area 823 of FIG. 8 in step S200), the objective function value calculating unit 15 determines that the convergence determination condition is satisfied in step S508.

As a result of S508, if it is determined that the convergence determination condition is not satisfied (S508→NO), the objective function value calculating unit 15 returns to the process in step S502 and generates each of new design variables in fifties. In addition, at this time, the objective function value calculating unit 15 selects a predetermined number of good individuals (total pressure loss coefficients) set in advance, from fifty total pressure loss coefficients which are calculated in step S506 as the final objective function values, and extracts design variables in the values. When good individuals are selected, for example, a method of extracting 20% of individuals in descending order of Ln in Equation (6) is used. Further, the objective function value calculating unit 15 performs crossing-over and mutation on the extracted design variables on the basis of a rule of the real-coded genetic algorithm so as to generate each of new individuals (design variables "A1", "A2", "A3" and "A4") in fifties as the next generation.

If the current number of generations exceeds the maximum number of generations (S507→YES) as a result of step S507, or if the convergence determination condition is satisfied (S508→YES) as a result of step S508, the objective function value calculating unit 15 stores the respective calculated design variable values, the respective objective function values, and the final objective function value in the database 20 as calculation result information along with calculation history (S509).

(Calculation Result Example)

Figure 13:
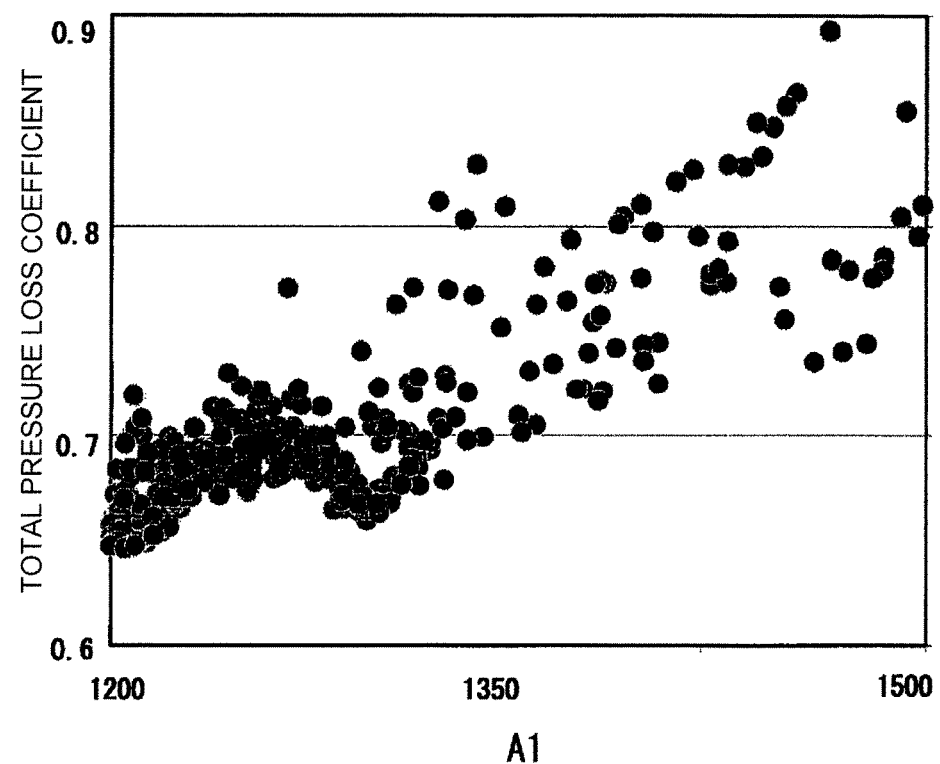
FIG. 13 is a diagram illustrating a display example of the calculation result according to the present embodiment.

FIG. 13 is a diagram illustrating a display example of the calculation result according to the present embodiment.

In FIG. 13, the transverse axis expresses "A1", and the longitudinal axis expresses the total pressure loss coefficient stored in step S509. Here, the displayed total pressure loss coefficient is values calculated in all the loops of FIG. 12.

In addition, although, practically, axes of "A2", "B1" and "B2" are given, here, a form is shown in which a response surface of the total pressure loss coefficient is observed from only the "A1" axis side.

The designer can advance a design while examining a relationship between the size and the total pressure loss coefficient by referring to the calculation result as shown in FIG. 13.

<In Case of Three Parts>

Next, with reference to FIGS. 14 to 19, a description will be made of an example in a case where multi-objective optimization in which three parts are connected to each other is performed as well as a single objective optimization problem in which two parts are connected to each other, and, further, a total material cost is added as a final objective function along with the total pressure loss coefficient.

In addition, since process procedures are almost the same as those described with reference to FIGS. 2 to 12, detailed description of the process will be omitted, and only locations different from FIGS. 2 to 12 will be described.

Figure 14:
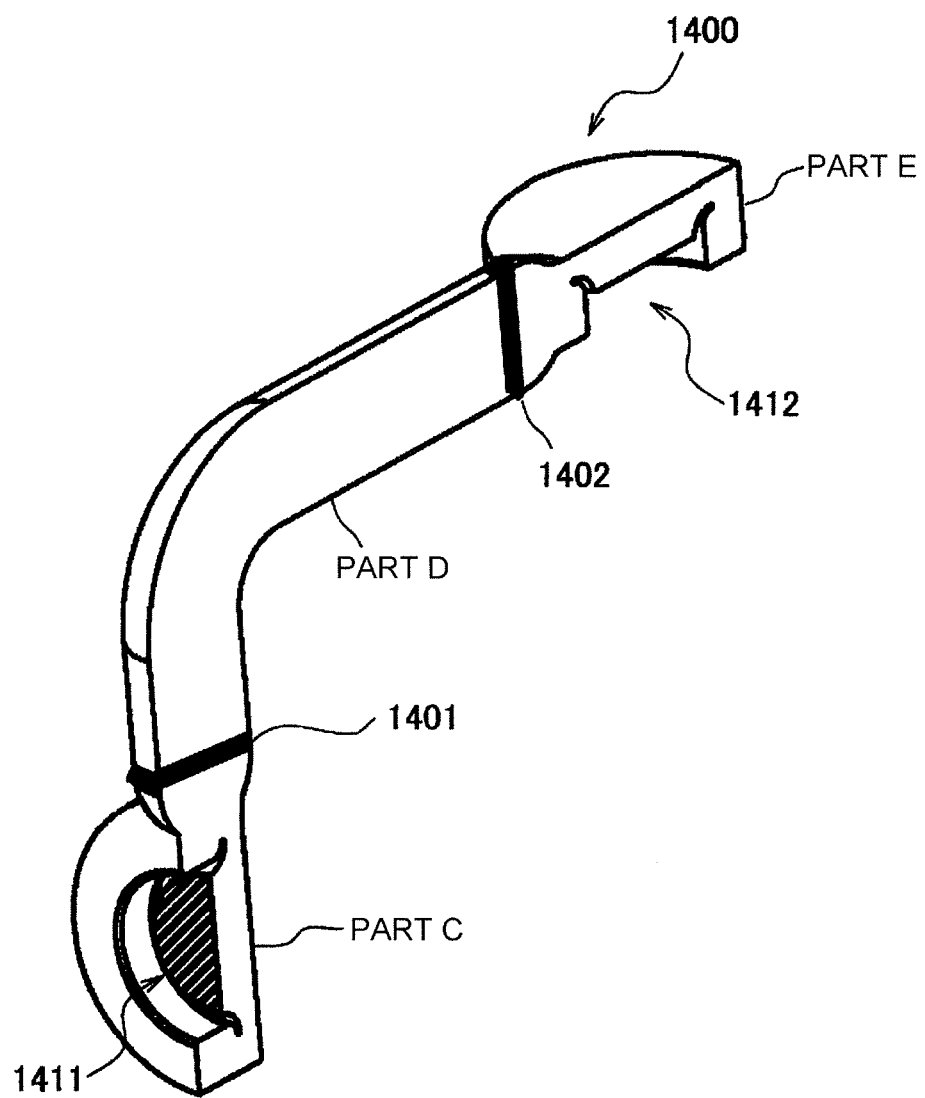
FIG. 14 is a diagram illustrating an example of the machine structure which is an analysis target in the present embodiment (three divisions).

FIG. 14 is a diagram illustrating an example of the machine structure which is an analysis target in the present embodiment.

As shown in FIG. 14, the machine structure 1400 is constituted by three parts including a part C, a part D, and a part E, and is an assembly through which a fluid can flow. The part C and the part D are connected via a connection portion 1401, and the part D and the part E are connected via a connection portion 1402. In the machine structure 1400, a fluid flows thereinto from an inlet boundary 1411, passes through the connection portions 1401 and 1402, and flows out of an outlet boundary 1412.

(Analysis Information Input Screen)

Figure 16:
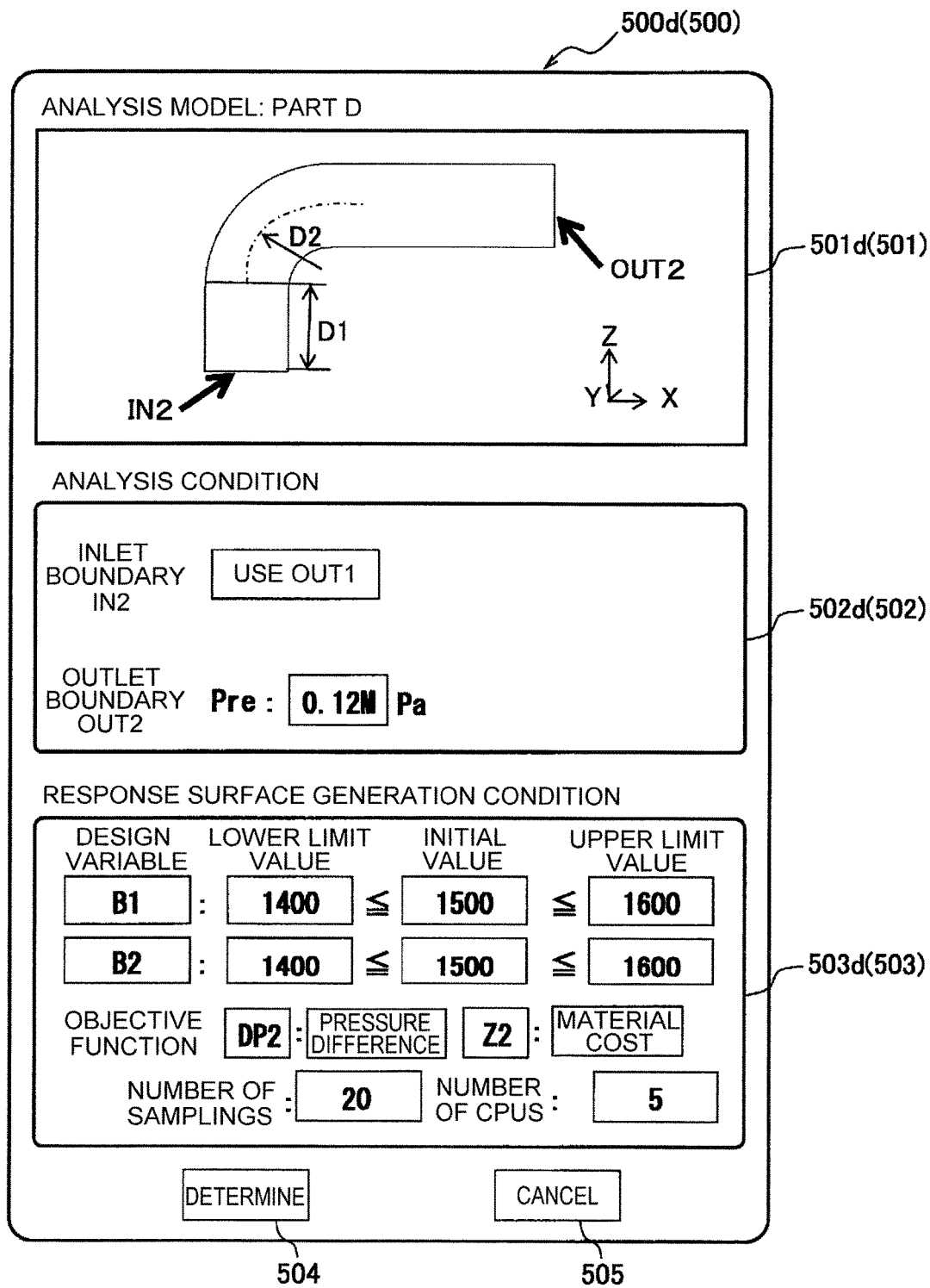
FIG. 16 is a diagram illustrating an example of the analysis information input screen regarding a part D.
Figure 17:
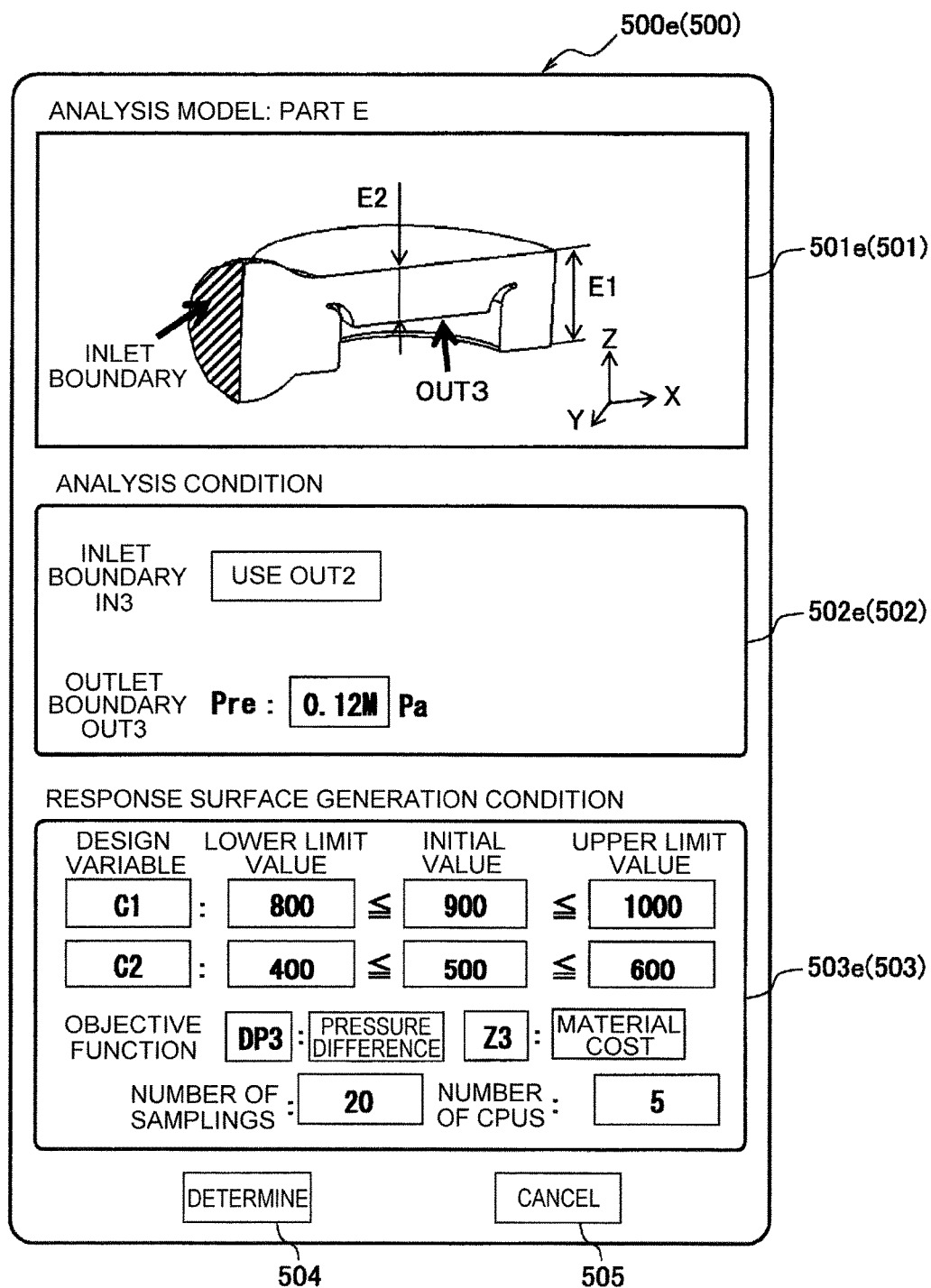
FIG. 17 is a diagram illustrating an example of the analysis information input screen regarding a part E.

FIGS. 15 to 17 are diagrams illustrating an example of the analysis information input screen displayed in step S101 (FIG. 3).

Here, FIG. 15 shows an analysis information input screen 500c (500) regarding the part C, FIG. 16 shows an analysis information input screen 500d (500) regarding the part D, and FIG. 17 shows an analysis information input screen 500e (500) regarding the part E.

Configurations of the respective areas 501c (501) to 503c (503), 501d (501) to 503d (503) and 501e (501) to 503e (503) of the analysis information input screens 500c to 500d are the same as those of FIGS. 5 and 6 except for corresponding to the three parts, and thus description thereof will be omitted; however, there is a difference from FIGS. 5 and 6 in that material costs Z1 to Z3 are designated as objective functions in the response surface generation condition input areas 503c to 503d.

(Objective Function Value Calculation Information Input Screen)

Figure 18:
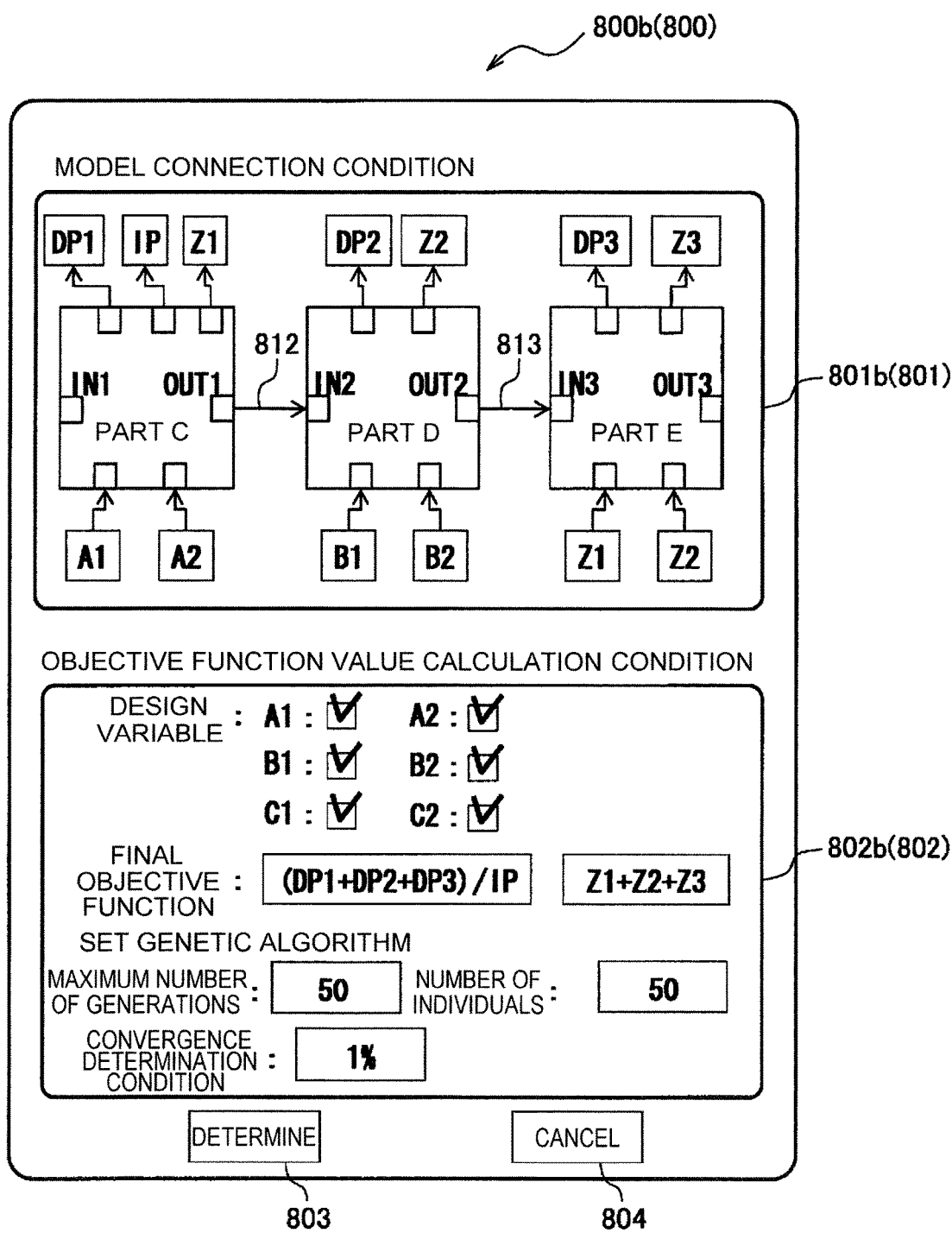
FIG. 18 is a diagram illustrating an example of the objective function value calculation information input screen according to the present embodiment (three divisions)

FIG. 18 is a diagram illustrating an example of the objective function value calculation information input screen displayed in step S201 (FIG. 7).

The respective areas 801b (800) and 802b (802) of the objective function value calculation information input screen 800b (800) shown in FIG. 18 are the same as those of FIG. 8, and thus description thereof will be omitted; however, a connection between the part C and the part D is indicated by an arrow 812, and a connection between the part D and the part E is indicated by an arrow 813 in the model connection condition input area 801b. In other words, each physical quantity at the outlet boundary "OUT1" of the part C is given to the inlet boundary "IN2" of the part D, and each physical quantity at the outlet boundary "OUT2" of the part D is given to the inlet boundary "IN3" of the part E.

In addition, in the objective function value calculation condition input area 802, a total pressure loss coefficient (DP1+DP2+DP3)/IP ("DP1" to "DP3" are loss coefficients in the part C to the part E) and a total material cost Z1+Z2+Z3 are designated as final objective functions.

(Processes)

As described above, the processes are the same as the processes of FIGS. 2 to 12 except that each process is performed on three parts, and thus a description will be made of only a process different from that in a case where the machine structure is divided into two parts. In addition, needless to say, information stored in the database 20 is information generated and calculated in each process.

First, in step S302 of FIG. 9, the analysis control unit 12 generates twenty sets of test plans for each of "C1", "C2", "D1", "D2", "E1", and "E2". Hereinafter, the analysis control unit 12 performs the processes in steps S303 to S308 according to these test plans.

In step S306 of FIG. 9, the analysis control unit 12 first performs a fluid analysis on the part C, passes each physical quantity at the outlet boundary "OUT1" (corresponding to the connection portion 1401 (FIG. 14)) of the part C as each physical quantity at the inlet boundary "IN2" of the part D in the next loop, and performs a fluid analysis on the part D. In addition, in the next loop, the analysis control unit 12 passes each physical quantity at the outlet boundary "OUT2" (corresponding to the connection portion 1402 (FIG. 14)) of the part D as each physical quantity at the inlet boundary "IN3" of the part E, and performs a fluid analysis on the part E.

In step S403 of FIG. 10, each physical quantity at the outlet boundary "OUT1" is parameterized in the first loop, and each physical quantity distribution at the outlet boundary "OUT2" is parameterized in the second loop. An order thereof is the same as in a case of two divisions except that the design variables "C1" and "C2" are used as a master variable x in the outlet boundary "OUT1", and the design variables "D1" and "D2" are used as a master variable x in the outlet boundary "OUT2".

Next, in step S405 of FIG. 10, if a part which is a processing target is the part C, the response surface generating unit 14 also calculates a Kriging coefficient of the material cost "Z1" in addition to the pressure difference "DP1". Here, the response surface generating unit 14 uses the material cost "Z1" as a dependent variable y and the design variables "C1" and "C2" as master variables, and calculates Kriging coefficients (a pair of Kriging coefficients; two Kriging coefficients) regarding the material cost "Z1" according to Equations (1) to (7), thereby generating a response surface regarding the material cost "Z1". Here, since the material cost is "volume of the part×preset material cost per unit volume", the material cost depends on variations in the volume due to variations in the design variables "C1" and "C2".

In step S405 regarding the part D, the response surface generating unit 14 uses the design variables "D1" and "D2" as master variables x, also uses the parameter (Kriging coefficient) of each physical quantity calculated in step S405 of the previous loop (that is, the part C) as a master variable x, uses the pressure difference "DP2", the material cost "Z2", and each physical quantity at the outlet boundary "OUT2" as dependent variables y, and calculates parameters (Kriging coefficients) of the pressure difference "DP2" and each physical quantity at the outlet boundary "OUT2" (corresponding to the connection portion 1402) according to the procedures of Equations (1) to (7), thereby calculating response surfaces thereof.

Since the part E is the most downstream part and thus a response surface of each physical quantity is not required to be calculated, the response surface generating unit 14 uses the design variables "E1" and "E2" and the parameter (Kriging coefficient) of each physical quantity at the connection portion 1402 as master variables x, uses the pressure difference "DP3" and the material cost "Z3" as dependent variables y, and calculates parameters (Kriging coefficients) of the pressure difference "DP3" and the material cost "Z3" according to the procedures of Equations (1) to (7), thereby calculating response surfaces thereof.

In step S502 of FIG. 12, the objective function value calculating unit 15 generates each of values of the design variables "C1", "C2", "D1", "D2", "E1", and "E2" in fifties (three hundred in total) between the upper limit value and the lower limit value of each design variable in the response surface generation condition input area 503.

In addition, in the calculation (S503 and S504) of an objective function value, the objective function value calculating unit 15 calculates "DP1" to "DP3" in the same manner as in the two parts, calculates a parameter of each physical quantity at the outlet boundary "OUT1" of the part C, and calculates a parameter of each physical quantity at the outlet boundary "OUT2" of the part D in the same procedures as in the two parts.

In addition, the objective function value calculating unit 15 also calculates costs "Z1", "Z2" and "Z3" of the respective parts in steps S503 and S504.

In step S503, the objective function value calculating unit 15 assigns the design variables "C1" and "C2" generated in step S502 to the master variables x of Equations (1) to (5) so as to calculate an objective function value of the cost "Z1" of the part C.

In addition, in step S504 regarding the part D, the objective function value calculating unit 15 assigns the values of the design variables "D1" and "D2" generated in step S502 and the parameter (Kriging coefficient) of each physical quantity at the outlet boundary "OUT1" calculated in step S405 to the master variables x of Equations (1) to (5) so as to calculate the cost "Z2" of the part D.

Further, in step S504 regarding the part E, the objective function value calculating unit 15 assigns the values of the design variables "E1" and "E2" generated in step S502 and the parameter (Kriging coefficient) of each physical quantity at the outlet boundary "OUT2" calculated in step S405 to the master variables x of Equations (1) to (5) so as to calculate the cost "Z3" of the part E.

In addition, in step S506, the objective function value calculating unit 15 calculates a total pressure loss coefficient ((DP1+DP2+DP3)/IP) in the same procedures as in the two divisions, and also calculates a total material cost (Z1+Z2+Z3) in addition to the total pressure loss coefficient.

Further, in step S500 in a case of three divisions, a method of extracting high rank individuals uses Pareto ranking.

(Calculation Result Example)

Figure 19:
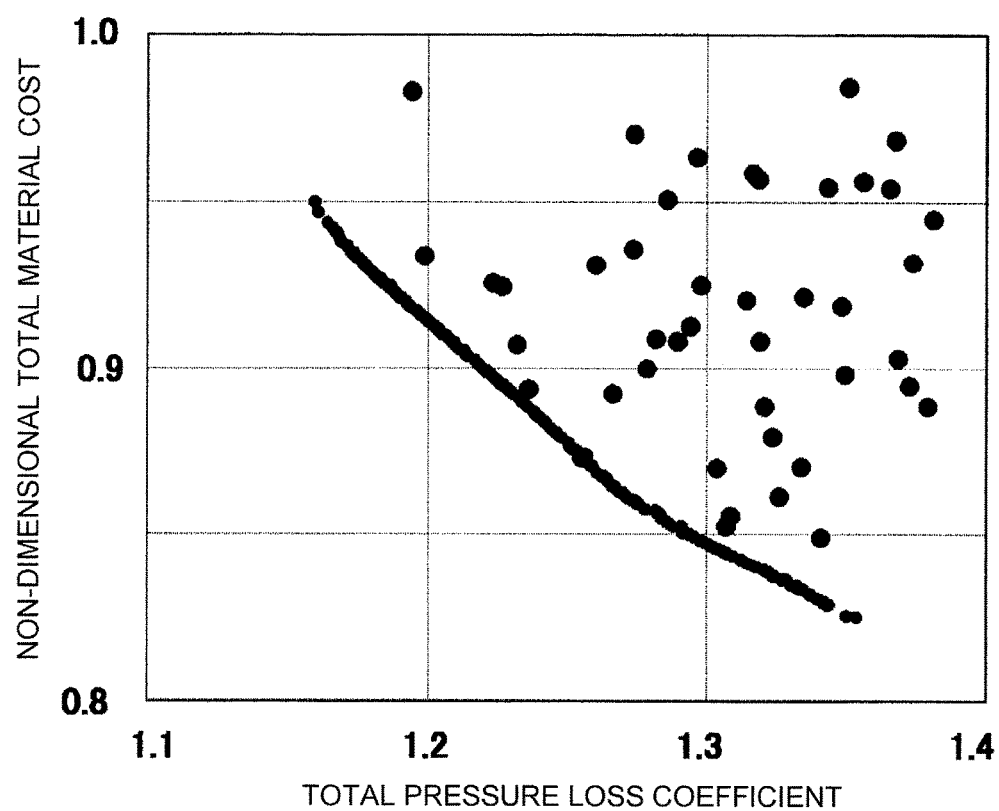
FIG. 19 is a diagram illustrating a display example of the calculation result according to the present embodiment.

FIG. 19 is a diagram illustrating a display example of the calculation result according to the present embodiment.

In FIG. 19, a total pressure loss coefficient is plotted on the transverse axis, and a non-dimensional total material cost is plotted on the longitudinal axis. The non-dimensional total material cost is obtained by normalizing a value which is obtained by dividing the total material cost calculated in step S506 by a predetermined material cost (for example, the highest material cost) or the like.

Although FIG. 13 shows a relationship between the design variable and the final objective value (total pressure loss coefficient), the final objective values may be displayed together like the total pressure loss coefficient and the non-dimensional total material cost (total material cost) as shown in FIG. 19.

In this way, the designer can advance the design while examining trade-off of the total pressure loss coefficient and the material cost.

CONCLUSION

According to the present embodiment, a machine structure which is an analysis target is divided, and a physical quantity distribution at a divided connection portion is parameterized and is given to a downstream part, thereby reducing a calculation load on calculation of an objective function value using a response surface while maintaining calculation accuracy. Therefore, it is possible to considerably reduce calculation time. In other words, it is possible to build a response surface with reduced analysis time and to thereby shorten time for calculation of an objective function value using the response surface.

In short, according to the present embodiment, since time for calculation of an objective function value using the response surface is reduced, it is possible to calculate an objective function value having a large analysis region and to perform optimization using this objective function value.

The inventor has confirmed that the best total pressure loss coefficient obtained through the analysis supporting process according to the present embodiment, and a total pressure loss coefficient obtained by performing the fluid analysis hitherto in a state in which the part A and the part B with the same sizes are integrated are in 3% or less of errors. In addition, in a case where a fluid analysis is performed in a state (a method hitherto) in which the part A and the part B are integrated, and an objective function value is calculated, twenty-five hours were taken to calculate a fluid of which the number of samples is 20, but calculation time of the fluid analysis performed in the method according to the present embodiment was twelve hours under the same condition. In this way, in the method according to the present embodiment, it was possible to reduce calculation time by approximately 50%.

In addition, although, in the present embodiment, the genetic algorithm is used as an optimization algorithm, the present invention is not limited thereto, and other optimization algorithms such as a steepest descent method may be used.

Further, although, in the present embodiment, the Kriging model is used as parameterization means, the present invention is not limited thereto, and, for example, a method of simplifying distributions may be used such as averaging distributions at a connection portion.

REFERENCE SIGNS LIST

1 ANALYSIS SUPPORTING APPARATUS
10 PROCESSING SECTION
11 INPUT PROCESSING UNIT
12 ANALYSIS CONTROL UNIT
13 CONNECTION INFORMATION GENERATING UNIT (PARAMETERIZATION PROCESSING UNIT)
14 RESPONSE SURFACE GENERATING UNIT (PARAMETERIZATION PROCESSING UNIT)
15 OBJECTIVE FUNCTION VALUE CALCULATING UNIT (OBJECTIVE VALUE CALCULATING UNIT)
16 DISPLAY PROCESSING UNIT
20 DATABASE
30 INPUT SECTION
40 DISPLAY SECTION

The invention claimed is:

1. An analysis supporting method of calculating a variation in at least one of a total pressure loss coefficient and a total material cost when an attribute value of an assembly through which fluid is to flow is varied, using a response surface, the method comprising:
   causing an analysis supporting apparatus including a processing section having an input processing unit, an analysis control unit, a connection information generating unit, a response surface generating unit, an objective function value calculating unit, and a display processing unit, as well as a database, an input system, and a display section, to:
   divide, with said connection information generating unit, shape data of the assembly through which fluid is to flow, which is an analysis target, into a plurality of divided shape data items at a connection boundary set via the input system when an objective attribute value is set, with the input system, as at least one of a total pressure loss coefficient and a total material cost, and a function regarding the at least one of the total pressure loss coefficient and the total material cost is set, with the input system, as an objective function;
   set, with the input system, a predetermined divided shape data item as a first divided shape data item among the plurality of divided shape data items, set, with the input system, a divided shape data item adjacent to the first divided shape data item as a second divided shape data item, and set, with the input system, a divided shape data item, which is adjacent to the second divided shape data item and is different from the first divided shape data item as a third divided shape data item;
   calculate, with the objective function value calculating unit, a first inlet dynamic pressure obtained by parameterizing an objective function in the first divided shape data item and a distribution parameter obtained by parameterizing a distribution of attribute values at the connection boundary, so as to parameterize, with the response surface generating unit, a response surface in the first divided shape data item;
   calculate, with the objective function value calculating unit, a second inlet dynamic pressure in the second divided shape data item based on the distribution parameter and the first inlet dynamic pressure in the first divided shape data item, and calculate a distribution parameter at the connection boundary between the second divided shape data item and the third divided shape data item based on the distribution parameter and the first inlet dynamic pressure in the first divided shape data item, so as to parameterize, with the response surface generating unit, a response surface in the second divided shape data item; and
   calculate, with the objective function value calculating unit, at least one of the total pressure loss coefficient and the total material cost based on the respective inlet dynamic pressure in each divided shape data item; and
   optimize a design of the assembly through which the fluid is to flow based on the at least one of the total pressure loss coefficient and the total material cost.

2. The analysis supporting method according to claim 1, wherein the at least one of the total pressure loss coefficient and the total material cost is displayed on a display unit of the display section.

3. The analysis supporting method according to claim 2, wherein a graph in which the at least one of the total pressure loss coefficient and the total material cost is correlated with the attribute value is displayed on the display unit.

4. The analysis supporting method according to claim 2, wherein the total pressure loss coefficient is one of a plurality of total pressure loss coefficients, wherein the total material cost is one of a plurality of total material costs, and wherein a graph with which the plurality of the total pressure loss coefficients are correlated with the plurality of total material costs is displayed on the display unit.

5. The analysis supporting method according to claim 1, wherein parameterization is performed using a Kriging model.

6. The analysis supporting method according to claim 5, wherein parameterization is performed using a genetic algorithm.

7. An analysis supporting apparatus, which calculates a variation in at least one of a total pressure loss coefficient and a total material cost when an attribute value of an assembly through which fluid is to flow is varied, using a response surface, the apparatus comprising:
   a processing section having an input processing unit, an analysis control unit, a connection information generating unit, a response surface generating unit, an objective function value calculating unit, and a display processing unit;
   a database;
   an input system; and
   a display section;
   wherein the connection information generating unit divides shape data of the assembly through which fluid is to flow, which is an analysis target, into a plurality of divided shape data items at a connection boundary set via the input system when the attribute value is set, as at least one of a total pressure loss coefficient and a total material cost, and a function regarding the at least one of the total pressure loss coefficient and the total material cost is set as an objective function;
   wherein the input system sets a predetermined divided shape data item as a first divided shape data item among the plurality of divided shape data items, a divided shape data item adjacent to the first divided shape data item as a second divided shape data item, and a divided shape data item, which is adjacent to the second divided shape data item and is different from the first divided shape data item as a third divided shape data item;
   wherein the objective function value calculating unit calculates a first inlet dynamic pressure obtained by parameterizing an objective function in the first divided shape data item and a distribution parameter obtained by parameterizing a distribution of attribute values at the connection boundary, so as to parameterize, with the response surface generating unit, a response surface in the first divided shape data item;
   wherein the objective function value calculating unit calculates a second inlet dynamic pressure in the second divided shape data item based on the distribution parameter and the first inlet dynamic pressure in the first divided shape data item, and calculates a distribution parameter at the connection boundary between the second divided shape data item and the third divided shape data item based on the distribution parameter and the objective function parameter in the first divided shape data item, so as to parameterize, with the response surface generating unit, a response surface in the second divided shape data item; and
   wherein an objective value calculating unit calculates the at least one of the total pressure loss coefficient and the total material cost based on the respective inlet dynamic pressure in each divided shape data item, thereby optimizing a design of the assembly through which the fluid is to flow based on the at least one of the total pressure loss coefficient and the total material cost.

* * * * *